United States Patent
Kinpara et al.

(10) Patent No.: US 6,979,975 B1
(45) Date of Patent: Dec. 27, 2005

(54) ROTATION STATE DETECTING APPARATUS OF A SYNCHRONOUS MACHINE

(75) Inventors: Yoshihiko Kinpara, Tokyo (JP); Toshiyuki Kaitani, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/979,335

(22) PCT Filed: Mar. 27, 2000

(86) PCT No.: PCT/JP00/01851

§ 371 (c)(1),
(2), (4) Date: Nov. 21, 2001

(87) PCT Pub. No.: WO01/73448

PCT Pub. Date: Oct. 4, 2001

(51) Int. Cl.$^7$ ................................. H02P 7/36
(52) U.S. Cl. .................. 318/705; 318/717; 318/719; 318/720; 318/721; 318/798; 318/799; 318/254; 318/700
(58) Field of Search ................. 318/700–724, 318/798–811, 254

(56) References Cited

U.S. PATENT DOCUMENTS

| | | | |
|---|---|---|---|
| 5,796,235 A | * 8/1998 | Schrodl et al. | 318/801 |
| 5,903,128 A | 5/1999 | Sakakibara et al. | |
| 6,281,656 B1 | * 8/2001 | Masaki et al. | 318/700 |
| 6,501,243 B1 | * 12/2002 | Kaneko et al. | 318/700 |

FOREIGN PATENT DOCUMENTS

| | | |
|---|---|---|
| EP | 793337 | 9/1997 |
| JP | 63-142270 | 6/1988 |
| JP | 3-226289 | 10/1991 |
| JP | 9-233900 | 9/1997 |
| JP | 11-41997 | 2/1999 |
| JP | 11-75394 | 3/1999 |

* cited by examiner

Primary Examiner—Marlon T. Fletcher
(74) Attorney, Agent, or Firm—Leydig, Voit & Mayer, Ltd.

(57) ABSTRACT

In a conventional rotation state detecting apparatus of a synchronous machine, since short-circuiting must be carried out twice or more when a rotation speed is detected, there have been problems in that it takes a time to detect a rotation state, and it takes a time to start up. A rotation state detecting apparatus for a synchronous machine according to the present invention has been made to solve the above problem, and includes a calculation unit for outputting a voltage vector command and a trigger signal and for outputting a rotation state of a synchronous machine having at least three windings in an idle state, a circuit unit for applying voltages to the respective phases of the synchronous machine on the basis of the voltage vector command, and a detection unit for detecting a current of the synchronous machine on the basis of the trigger signal and outputting a value of the detected current to the calculation unit. The calculation unit outputs a voltage vector for short-circuiting the respective phases of the synchronous machine, outputs trigger signals on at least one occurrence of the short-circuiting to produce current values from the detection unit multiple times, and calculates a rotation speed and a rotation position of the synchronous machine.

5 Claims, 21 Drawing Sheets

| $\theta_c$ [DEGREE] | X |
|---|---|
| 0 ~ 45 | 15 |
| 45 ~ 90 | 14 |
| 90 ~ 135 | 6 |
| 135 ~ 180 | 4 |
| 180 ~ 225 | 0 |
| 225 ~ 270 | 1 |
| 270 ~ 315 | 9 |
| 315 ~ 360 | 11 |

(b)

| X | $\theta_{c1}$ [DEGREE] |
|---|---|
| 15 | 22.5 |
| 14 | 67.5 |
| 6 | 112.5 |
| 4 | 157.5 |
| 0 | 202.5 |
| 1 | 247.5 |
| 9 | 292.5 |
| 11 | 337.5 |

FIG. 15

|  |  | Yes | No |
|---|---|---|---|
| STEP301 | $ia1 > 0?$ | $Y = 128$ | $Y = 0$ |
| STEP302 | $ib1 > 0?$ | $Y = Y + 64$ | $Y = Y$ |
| STEP303 | $ix1 > 0?$ | $Y = Y + 32$ | $Y = Y$ |
| STEP304 | $iy1 > 0?$ | $Y = Y + 16$ | $Y = Y$ |
| STEP305 | $iay1 > 0?$ | $Y = Y + 8$ | $Y = Y$ |
| STEP306 | $iax1 > 0?$ | $Y = Y + 4$ | $Y = Y$ |
| STEP307 | $ixb1 > 0?$ | $Y = Y + 2$ | $Y = Y$ |
| STEP308 | $iby'1 > 0?$ | $Y = Y + 1$ | $Y = Y$ |

FIG. 16

| θc [DEGREE] | Y |
|---|---|
| 0.0 ~ 22.5 | 255 |
| 22.5 ~ 45.0 | 251 |
| 45.0 ~ 67.5 | 235 |
| 67.5 ~ 90.0 | 233 |
| 90.0 ~ 112.5 | 105 |
| 112.5 ~ 135.0 | 104 |
| 135.0 ~ 157.5 | 72 |
| 157.5 ~ 180.0 | 64 |
| 180.0 ~ 202.5 | 0 |
| 202.5 ~ 225.0 | 4 |
| 225.0 ~ 247.5 | 20 |
| 247.5 ~ 270.0 | 22 |
| 270.0 ~ 292.5 | 150 |
| 292.5 ~ 315.0 | 151 |
| 315.0 ~ 337.5 | 183 |
| 337.5 ~ 360.0 | 191 |

FIG. 17

| Y | $\theta c1$ [DEGREE] |
|---|---|
| 255 | 11.25 |
| 251 | 33.75 |
| 235 | 56.25 |
| 233 | 78.75 |
| 105 | 101.25 |
| 104 | 123.75 |
| 72 | 146.25 |
| 64 | 168.75 |
| 0 | 191.25 |
| 4 | 213.75 |
| 20 | 236.25 |
| 22 | 258.75 |
| 150 | 281.25 |
| 151 | 303.75 |
| 183 | 326.25 |
| 191 | 348.75 |

PRIOR ART

PRIOR ART

PRIOR ART

PRIOR ART

PRIOR ART

ROTATION STATE DETECTING APPARATUS OF A SYNCHRONOUS MACHINE

TECHNICAL FIELD

The present invention relates to a rotation state detecting apparatus for a synchronous machine and a rotation state detecting method for a synchronous machine, and particularly to an apparatus and a method for detecting a rotation state of a synchronous machine in an idle state, without using a position detector, such as an encoder.

BACKGROUND ART

In order to drive a synchronous machine such as a synchronous motor, information concerning the rotation speed and the rotation position of a rotor are indispensable. If a position detector such as an encoder is used, it is possible to know the rotation position of the rotor, and it is also possible to obtain the rotation speed from a change rate of the rotor position. However, there are defects in that the position detector is expensive, and complicated wiring is required in a case where an encoder is used. There have been invented many methods for driving a synchronous motor without using a position detector. In these methods, a voltage applied to the synchronous motor is controlled on the basis of a current of the synchronous motor, and driving of the synchronous motor is basically started from a stopped state.

Incidentally, in the case where the synchronous motor is driven from the idle state without using the position detector, the initial values of the rotation speed and the rotation position at the time of starting are indispensable. If a voltage detector is provided, the rotation speed and the rotation position can be easily known from an induced voltage in the idle state, however, in this case, since the voltage detector becomes redundantly necessary, the cost of the whole apparatus is raised.

Then, in order to start the driving of the synchronous motor from the idle state without using the position detector or the voltage detector, there has been devised a technique for detecting the rotation speed and the rotation position by short-circuiting all phases of terminals of the synchronous motor.

FIG. 18 is a block structural view showing a conventional rotation speed and rotation position detecting apparatus of a synchronous motor disclosed in, for example, Japanese Patent Laid-Open No. 11-75394.

In the drawing, reference numeral 1 designates an embedded magnet type synchronous motor including three-phase windings; 2, calculation means for outputting a voltage vector command and a trigger signal and for outputting a rotation speed and a rotation position in an idle state; 3, circuit means for applying voltages to respective phases of the synchronous motor 1 on the basis of the voltage vector command; and 4, detection means for detecting a current of the synchronous motor 1 on the basis of the trigger signal and for outputting the current to the calculation means 2.

Next, a detecting method of the rotation speed and the rotation position of a rotator in an idle state will be described. In the following, it is assumed that the rotation speed ω [rad/s] (electrical angular speed) in the idle state has a constant value, and the initial value of current is 0, and the winding resistance is neglected. Strictly, when the rotator is in the idle state and the terminals of the synchronous motor 1 are short-circuited in all phases, a torque is generated, so that the rotation speed ω is changed. However, in the case where the short circuit period is short, since the change of the rotation speed ω can be neglected, ω may be treated as a constant value. Besides, in the case where the short circuit period is short, since the attenuation of waveform by the winding resistance is also small, its value can also be neglected. Further, if a suitable voltage vector command is given to the circuit means 3, the initial value of current at the time of start of short-circuiting becomes 0. Incidentally, the voltage vector command given to the circuit means 3 will be described later.

The following expression is established on a rotating coordinate axis (d-q axis) rotating in synchronization with a rotator magnetic flux after t seconds from the start of short-circuiting.

$$\begin{pmatrix} i_d \\ i_q \end{pmatrix} = \begin{pmatrix} \frac{\phi}{L_d}(\cos \omega t - 1) \\ -\frac{\phi}{L_q}\sin \omega t \end{pmatrix} \quad (1)$$

where, $i_d$: d-axis component of current
 $i_q$: q-axis component of current
 $L_d$: d-axis component of winding inductance
 $L_q$: q-axis component of winding inductance
 $\phi$: rotator magnetic flux On the other hand, the following expression is established between a current on a rest coordinate axis (a-b axis) and a current on the rotating coordinate axis (d-q axis).

$$i_d^2 + i_q^2 = i_a^2 + i_b^2 \quad (2)$$

where, $i_a$: a-axis component of current
 $i_b$: b-axis component of current

Accordingly, when the currents $i_a$ and $i_b$ detected after $T_0$ seconds from the start of short-circuiting are defined as $i_{a01}$ and $i_{b01}$, the following expression is established with respect to a current amplitude value $I_a$.

$$I_s = \sqrt{i_{a01}^2 + i_{b01}^2} \quad (3)$$
$$= \frac{\phi^2}{L_d^2}(\cos\omega T_0 - 1)^2 + \frac{\phi^2}{L_q^2}\sin^2\omega T_0$$

where, $T_0$: predetermined value satisfying $0 < |\omega| \times T_0 < \pi/2$.

The relation between the current amplitude value $I_a$ and the absolute value $|\omega|$ of the rotation speed can be derived from the expression (3), and the relation is shown in FIG. 19. If the relation of FIG. 19 is stored in advance, the absolute value $|\omega|$ of the rotation speed can be uniquely obtained from the current amplitude value $I_a$. However, although the absolute value of the rotation speed can be derived from the expression (3), its rotation direction is unknown. Then, during a period shorter than a period of time in which the rotator makes a forward movement of 180 degrees in electrical angle when the rotator rotates at a maximum speed (regulated value), the voltage vector for short-circuiting the three-phase windings is changed to a voltage vector for making the current amplitude zero, and the value of the current is returned to 0. Successively, second all-phase short-circuiting is carried out, and a current after $T_0$ from the start of the second short-circuiting is detected. The currents $i_a$ and $i_b$ detected at this time are defined as $i_{a02}$ and $i_{b02}$. From the magnitude relation between a current phase $\theta_{c01}$ after $T_0$ from the start of the first short-circuiting and a current phase $\theta_{c02}$ after $T_0$ from the start of the second short-circuiting, a sign of the rotation speed is judged.

The current phase $\theta_{c01}$ can be obtained by calculating expression (4).

$$\theta_{c01} = \tan^{-1}\frac{i_{b01}}{i_{a01}} \quad (4)$$

Similarly, the current phase $\theta_{c02}$ can be obtained by calculating expression (5).

$$\theta_{c02} = \tan^{-1}\frac{i_{b02}}{i_{a02}} \quad (5)$$

The sign of $\omega$ is judged from the sign of a difference between $\theta_{c01}$ and $\theta_{c02}$. The rotation speed $\omega$ can be detected from the above.

On the other hand, when currents on the d-g axis after $T_0$ from the start of the second short-circuiting are defined as $i_{d02}$ and $i_{q02}$ the relation of expression (6) is established with respect to the rotation position $\theta$.

$$\theta = \theta_{c02} - \tan^{-1}\frac{i_{q02}}{i_{d02}} \quad (6)$$

The values of $i_{d02}$ and $i_{q02}$ can be calculated by substituting the detected rotation speed $\omega$ and the short circuit time $T_0$ for the expression (1). That is, from the detected rotation speed $\omega$, the short circuit time $T_0$, and the expression (6), the rotation position $\theta$ can be calculated.

From the above principle, in the above conventional apparatus, the voltage vector for short-circuiting the three-phase windings is twice outputted from the calculation means 2, the current of the synchronous motor 1 is once detected each time when the short-circuiting is carried out, and the rotation speed and the rotation posit ion of the synchronous motor in the idle state can be detected by using the plurality of detected current detection values.

The conventional apparatus will be described in more detail. FIG. 20 is a structural view of the circuit means 3 in the conventional apparatus shown in FIG. 18, and in the drawing, reference numeral 5 designates a semiconductor switch (for example, IGBT: Insulated Gate Bipolar Transistor) which is turned on and off based on a gate signal Q1; 6, a semiconductor switch turned on and off based on a gate signal Q2; 7, a semiconductor switch turned on and off based on a gate signal Q3; 8, a semiconductor switch turned on and off based on a gate signal Q4; 9, a semiconductor switch turned on and off based on a gate signal Q5; 10, a semiconductor switch turned on and off based on a gate signal Q6; and 11; a DC voltage source of a potential difference Ed.

Next, the operation of the circuit means 3 will be described. The circuit means 3 has the following eight switching modes.

| Switching mode | Combination of gate signals Q1 to Q6 for turning on |
|---|---|
| [V0] | all are turned off |
| [V1] | Q1, Q5, Q6 |
| [V2] | Q1, Q2, Q6 |
| [V3] | Q4, Q2, Q6 |
| [V4] | Q4, Q2, Q3 |

-continued

| Switching mode | Combination of gate signals Q1 to Q6 for turning on |
|---|---|
| [V5] | Q4, Q5, Q3 |
| [V6] | Q1, Q5, Q3 |
| [V7] | Q1, Q2, Q3 |
| [V8] | Q4, Q5, Q6 |

The switching modes V7 and V8 are voltage vectors having a magnitude of 0, and the terminals of the synchronous motor 1 at this time are all-phase short-circuited. That is, the switching modes V7 and V8 are voltage vectors for short-circuiting the three-phase windings. The switching modes V1 to V6 are vectors having a phase difference of 60 degrees between adjacent ones and the magnitudes of V1 to V6 are equal to one another. In the switching mode V0, the current flowing through each phase of the synchronous motor 1 flows through the inside of the circuit means 3 in the direction to charge the DC voltage source 11, and the value of the current of the synchronous motor 1 is returned to 0 at the time when the current flowing through each phase is attenuated to 0. That is, when the switching mode is made V0, it is possible to return the value of the current of the synchronous motor 1 to 0 irrespective of a rest state or an idle state.

FIG. 21 is a structural view of the detection means 4, and in the drawing, reference numeral 12 designates a current detector for detecting a U-phase current; 13, a current detector for detecting a V-phase current; 14, a current detector for detecting a W-phase current; 15, a signal converter for sample-holding a signal obtained from the detector 12 at the rising time of a trigger signal, converting an analog signal into a digital signal, and outputting a U-phase current detection value; 16, a signal converter for sample-holding a signal obtained from the detector 13 at the rising time of a trigger signal, converting an analog signal into a digital signal, and outputting a V-phase current detection value; and 17, a signal converter for sample-holding a signal obtained from the detector 14 at the rising time of a trigger signal, converting an analog signal into a digital signal, and outputting a W-phase current detection value.

From the above structure, the detector 4 samples the current of each phase at the rising time of the trigger signal and converts it into the digital signal to output it.

FIG. 22 is a structural view of the calculation means 2, and in the drawing, reference numeral 18 designates an input circuit for inputting a detection current; 19, a CPU; 20, a memory for storing a program; 21, an output circuit for outputting a voltage vector command; 22, an output circuit for outputting a trigger signal; and 23, an output circuit for outputting a rotation position 8 and a rotation speed $\omega$.

FIG. 23 is a view showing an example of relations between the time and the switching mode in the voltage vector command outputted by the calculation means 2 to the circuit means 3, the current amplitude value Is calculated in the calculation means 2, and the trigger signal outputted by the calculation means 2 to the detection means 4. In FIG. 23, at time $t_0$, the calculation means 2 changes the switching mode which has been outputted from the output circuit 21 to the circuit means 3, from V0 to V7. Then, at a point of time (time $t_0$) when a predetermined period $T_0$ has elapsed, the calculation means changes the switching mode outputted to the circuit means 3 from V7 to V0, and at the same time, outputs the trigger signal from the output circuit 22.

The detection means 4 outputs the respective currents of U, V and W phases at the time when the trigger signal rises, that is, at the time, $t_1$ to the calculation means 2. Then, after the currents $i_u$, $i_v$ and $i_w$ are inputted from the input circuit 18, a program stored in the memory 20 in advance is executed by the CPU 19.

The following expression (7) is established between the respective currents $i_u$, $i_v$, $i_w$ of the U, V, W phases and $i_a$, $i_b$.

$$\begin{pmatrix} i_a \\ i_b \end{pmatrix} = \sqrt{\frac{2}{3}} \begin{pmatrix} 1 & -\frac{1}{2} & -\frac{1}{2} \\ 0 & \frac{\sqrt{3}}{2} & -\frac{\sqrt{3}}{2} \end{pmatrix} \begin{pmatrix} i_u \\ i_v \\ i_w \end{pmatrix} \quad (7)$$

The calculation means 2 calculates $i_{a01}$, $i_{b01}$, and $I_{c01}$, and $I_a$ in accordance with the expressions (3), (4) and (7). Then, on the basis of $I_a$ and the relation of FIG. 19 stored in advance, the absolute value $|\omega|$ of the rotation speed is obtained, and $\theta_{c01}$ and $|\omega|$ are stored.

After the circuit means 3 outputs the switching mode V0, in the inside of the circuit means 3, the current flowing through each phase flows in the direction to charge the DC voltage source 11, and the value of the current of the synchronous motor 1 returns to 0 (time $t_2$). Thereafter, after a period shorter than a period of time in which the rotator makes a forward movement of 180 degrees in electrical angle when the rotator rotates at the maximum speed (rated value) has elapsed (time $t_3$), the calculation means 2 changes the switching mode outputted to the circuit means 3 again from V0 to V7. Then, at a point of time (time $t_4$) when a predetermined period $T_0$ has elapsed, the calculation means 2 changes the switching mode outputted to the circuit means 3 from V7 to V0, and at the same time, outputs the trigger signal. The detection means 4 outputs the respective currents of U, V and W phases at the rising time of the trigger signal, that is, at the time $t_4$ to the calculation means 2. The calculation means 2 calculates $i_{a02}$, $i_{b02}$ and $\theta_{c02}$ in accordance with the expressions (5) and (7), and determines the sign of the rotation speed $\omega$ from the magnitude relation between $\theta_{c01}$ and $\theta_{c02}$, and simultaneously calculates the rotation position $\theta$ using the expressions (1) and (6). The calculation means 2 outputs $\omega$ and $\theta$ obtained by the above processing as the rotation speed and the rotation position from the output circuit 23.

The conventional rotation speed and rotation position detecting apparatus of the synchronous machine has problems as follows.

Since the sign of the rotation speed can not be detected through one occurrence of short-circuiting, it has been necessary to short-circuit twice in order to detect the sign of the rotation speed. Besides, since the sign of the rotation speed is indispensable for the detection of the rotation position, it has been necessary to short-circuit twice in order to detect the rotation position as well. That is, since it has been necessary to short-circuit twice to detect the rotation speed and the rotation position, it takes a time to detect the rotation speed and the rotation position, and there has been a problem in that it takes a time to start up.

Besides, since the period of the short circuit is set constant, the value of the detected current becomes low in the idle state in which the rotation speed is low. As a result, there has been a problem in that detection accuracy is deteriorated by the influence of detection noise, cancellation of significant digit of an AD converter, or the like. In order to solve the problem, there is devised a method in which in the case where the value of the detection current is low, a short circuit period is again set longer and detection is again made. However, in this case, since the number of times of detection is increased, it takes a time to detect the rotation speed and the rotation position, and there has been a problem in that it takes a time to start up.

Further, in the process for calculating the rotation position since the phase difference between the rotation position $\theta$ and the current phase $\theta_{c02}$ is changed in accordance with the rotation speed, there has been problems in that calculation must be made each time when and it takes a time. Besides, since this calculation uses an arc tangent function, there has been a problem in that complicated calculation is required.

The present invention has been made to solve the above problems, and has an object to provide an apparatus and a method in which a rotation state of a synchronous machine can be detected in a short time, and further has an object to provide an apparatus which can detect a rotation state with accuracy and ease.

SUMMARY OF THE INVENTION

According to a first aspect of the present invention, a rotation state detecting apparatus of a synchronous machine includes calculation means for outputting a voltage vector command and a trigger signal and for outputting a rotation state of a synchronous machine having windings of three phases or more in an idle state, circuit means for applying voltages to the respective phases of the synchronous machine on the basis of the voltage vector command, and detection means for detecting a current of the synchronous machine on the basis of the trigger signal and for outputting a value of the detected current to the calculation means, characterized in that the calculation means outputs a voltage vector for short-circuiting the respective phases of the synchronous machine to short-circuit the respective phases of the synchronous machine, outputs a plurality of trigger signals on at least one occurrence of short-circuiting to obtain current values from the detection means plural times, and calculates the rotation state.

According to this, the rotation state can be detected in a short time, and there is an effect that a time up to starting can be shortened.

According to a second aspect of the present invention, in the rotation state detecting apparatus of the synchronous machine of the first aspect, the calculation means calculates a current amplitude value in regard to the current value obtained from the detection means each time when the trigger signal is outputted, and calculates a magnitude of a rotation speed on the basis of a time until the current amplitude value reaches a predetermined value.

According to this, it is possible to prevent the value of the detected current from decreasing at an idle time when the rotation speed is low and to keep the detection accuracy without receiving the influence of detection noise, cancellation of significant digit of an AD converter, or the like, and further, it is not necessary to make a detection again after a short circuit period is again set long, so that the rotation state can be detected in a short time.

According to a third aspect of the present invention, in the rotation state detecting apparatus of the synchronous machine of the second aspect, after the current amplitude value reaches the predetermined value, the calculation means changes a voltage vector to be outputted to the circuit means from the voltage vector for short-circuiting the respective phases of the synchronous machine to a voltage vector for making the current amplitude value zero.

According to this, even at the idle time when the rotation speed is low, it is possible to make the current amplitude value reach the predetermined value.

According to a fourth aspect of the present invention, in the rotation state detecting apparatus of the synchronous machine of the second aspect, in a case where the current amplitude value does not reach the predetermined value even if a maximum stand-by time elapses from start of short-circuiting, the calculation means judges that the synchronous machine does not run idle, and outputs the rotation speed as zero.

According to this, there is an effect that in the case where the synchronous machine does not run idle, the detection of the rotation state can be quickly ended.

According to a fifth aspect of the present invention, in the rotation state detecting apparatus of the synchronous machine of the first aspect, the calculation means calculates a sign of a rotation speed on the basis of the current value detected at least twice on one occurrence of short circuiting.

According to this, since the sign of the rotation speed can be calculated through the one occurrence of short circuiting, there is an effect that the detection time of the rotation speed can be shortened.

According to a sixth aspect of the present invention, in the rotation state detecting apparatus of the synchronous machine of the fifth aspect, the calculation means calculates the sign of the rotation speed in such a manner that in a case where a salient pole ratio of winding inductance of the synchronous machine is larger than two, the sign becomes different from a result of calculation of the sign of the rotation speed performed in a case where the salient pole ratio is smaller than two.

According to this, even in the case where the salient pole ratio of the winding inductance is larger than two, the sign of the rotation speed can be detected through the one occurrence of short circuiting.

According to a seventh aspect of the present invention, in the rotation state detecting apparatus of the synchronous machine of the first aspect, the calculation means converts the current value obtained from the detection means into at least two kinds of calculation currents, calculates a current phase on the basis of signs of the calculation currents, and adds or subtracts a predetermined value to or from the current phase on the basis of a sign of a rotation speed, so that a rotation position is outputted.

According to this, there is an effect that the rotation position can be outputted by simple calculation without using an arc tangent function.

According to an eighth aspect of the present invention, in the rotation state detecting apparatus of the synchronous machine of the first aspect, the calculation means calculates a current amplitude value in regard to the current value obtained from the detection means each time when the trigger signal is outputted, calculates a magnitude of a rotation speed on the basis of a time until the current magnitude value reaches a predetermined value, and calculates a sign of the rotation speed on the basis of the current values detected at least twice on one occurrence of short circuiting.

According to this, there is an effect that the rotation speed can be detected in a short time and with accuracy.

In a rotation state detecting method of a synchronous machine according to the present invention, when a rotation state of a synchronous machine having windings of three phases or more in an idle state is detected, a voltage vector for short-circuiting the respective phases of the synchronous machine is outputted to short-circuit the respective phases of the synchronous machine, a current of the synchronous machine is detected plural times on at least one occurrence of short-circuiting, and the rotation state is calculated from a value of the detected current.

According to this, the rotation state can be detected in a short time, and there is an effect that a time up to starting can be shortened.

BRIEF DESCRIPTION OF THE DRAWINGS

FIG. 12 is an explanatory view for explaining a method of calculation of rotation position in the rotation speed and rotation position detecting apparatus of the synchronous motor according to the embodiment 1, FIGS. 14, 15, 16, and 17 are explanatory views for explaining a method of calculating rotation position in a rotation speed and rotation position detecting apparatus of a synchronous motor according to embodiment 2.

BEST MODE FOR CARRYING OUT THE INVENTION

Embodiment 1

Figure 1:
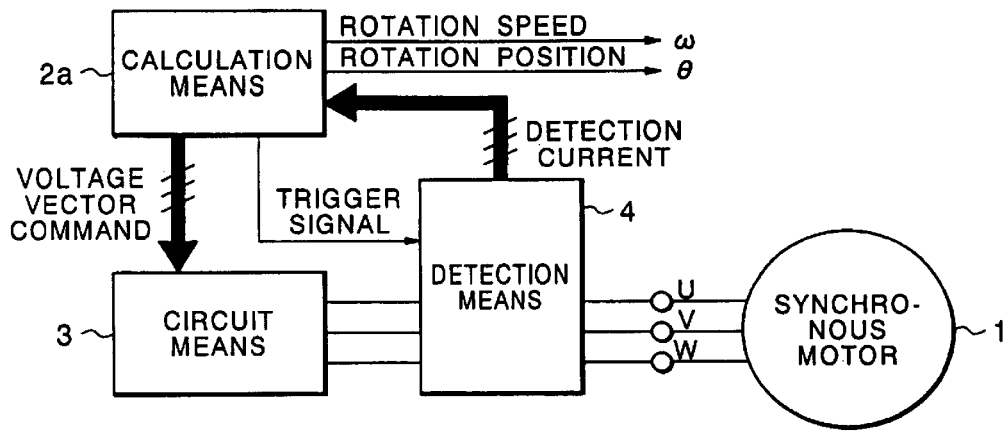
FIG. 1 is a block diagram of a rotation speed and rotation position detecting apparatus of a synchronous motor according to embodiment 1.

Hereinafter, an embodiment of the present invention will be described with reference to the drawings. FIG. 1 is a block structural view showing a rotation speed and rotation position detecting apparatus of a synchronous motor according to a first embodiment of the present invention. In FIG. 1, reference numeral 1 designates an embedded magnet type synchronous motor including three-phase windings; reference symbol 2a, calculation means for outputting a voltage vector command and a trigger signal and for outputting a rotation speed and a rotation position in an idle state; reference numeral 3, circuit means for applying voltages to respective phases of the synchronous motor 1 on the basis of the voltage vector command; and 4, detection means for detecting a current of the synchronous motor 1 on the basis of the trigger signal and outputting the current to the calculation means 2a.

Figure 2:
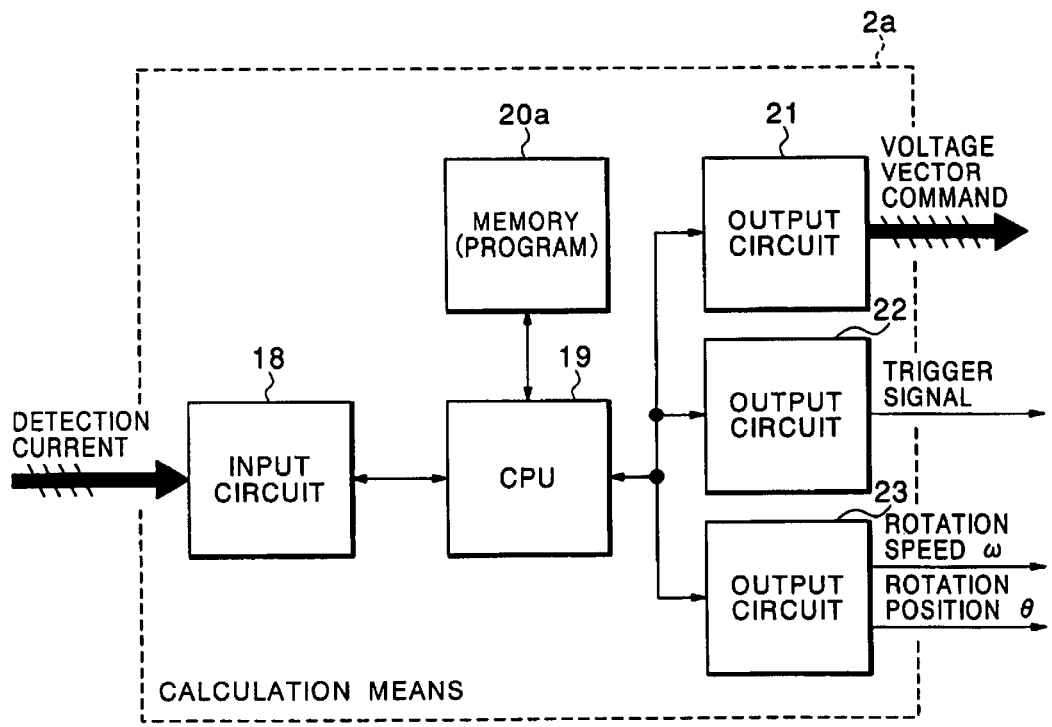
FIG. 2 is a diagram of a structure of calculation means according to the embodiment 1.
Figure 22:
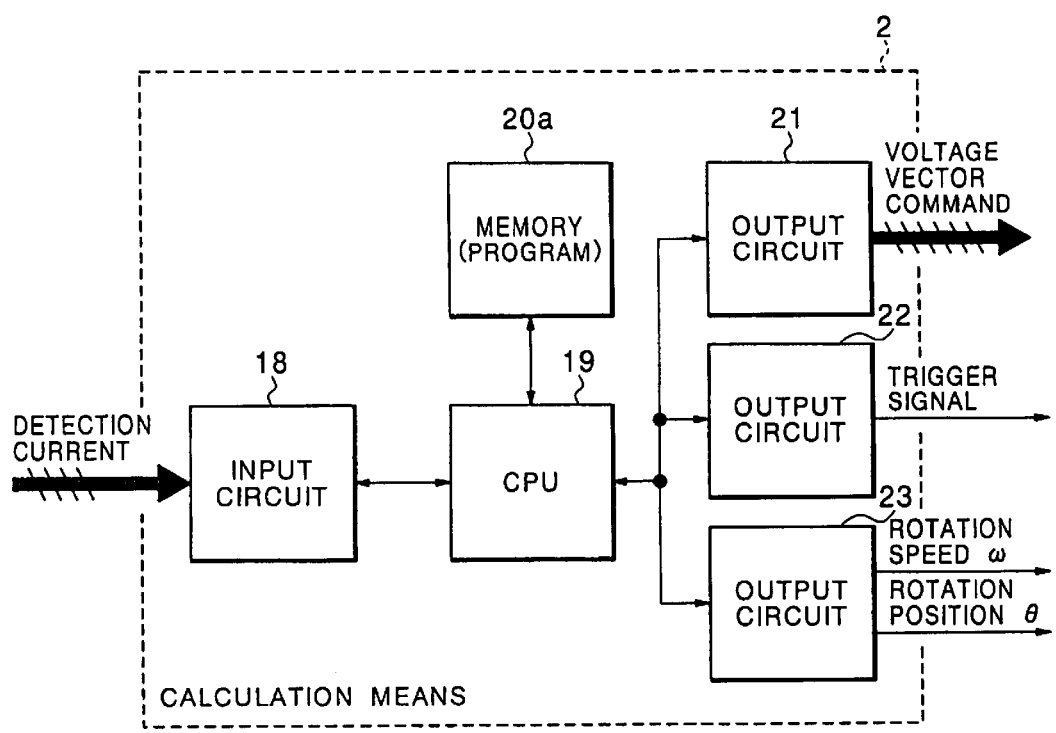
FIG. 22 is a block structural view showing a structure of conventional calculation means.
Figure 23:
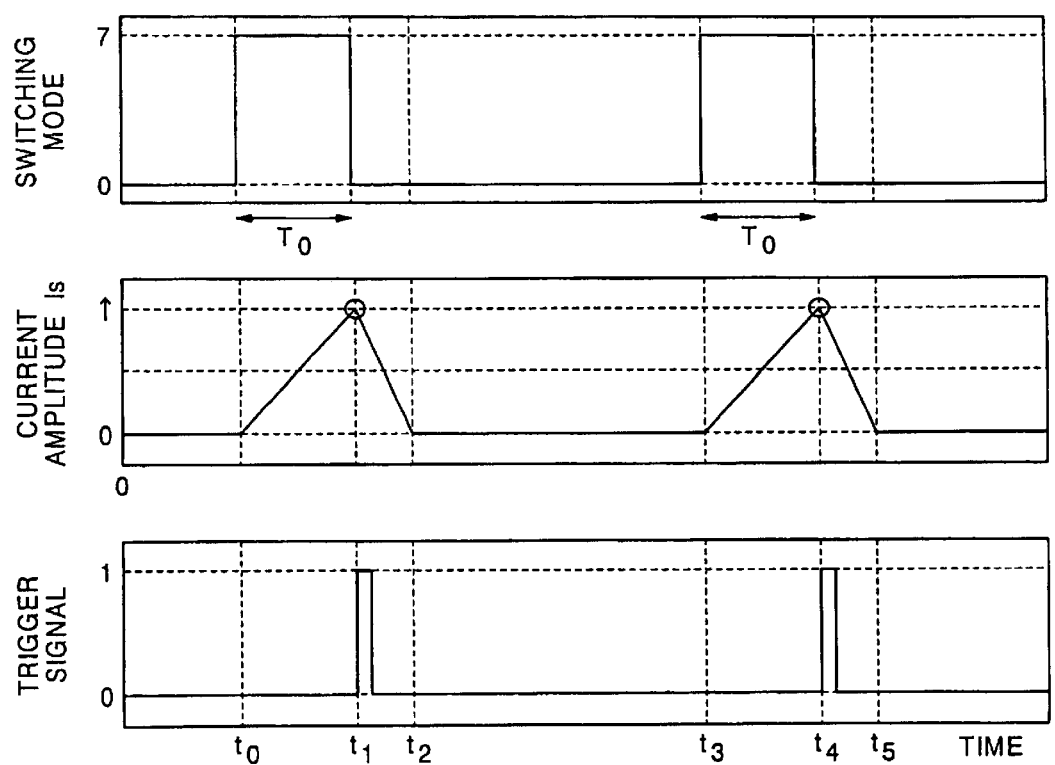
FIG. 23 is an explanatory view for explaining an operation of the conventional rotation speed and rotation position detecting apparatus of the synchronous motor.

Similarly to the conventional calculation means 2 shown in FIG. 22, the calculation means 2a is constituted by an input circuit 18 for inputting a detection current, a CPU 19, a memory 20a for storing a program, an output circuit 21 for outputting a voltage vector command, an output circuit 22 for outputting a trigger signal, and an output circuit 23 for outputting a rotation speed and a rotation position θ (FIG. 2).

Next, the operation principle of this embodiment will be described.

First, detection of the rotation speed ω will be described. When a phase $\theta_s = \omega t$, current components $i_d$ and $i_q$ on the rotating coordinate axis (d-q axis) after t seconds from the start of short-circuiting are expressed by expression (8) from the expression (1).

$$\begin{pmatrix} i_d \\ i_q \end{pmatrix} = \frac{\phi}{L_q} \begin{pmatrix} k(\cos\theta_s - 1) \\ -\sin\theta_s \end{pmatrix} \quad (8)$$

Where, k is a salient pole ratio ($= L_q/L_0$) of winding inductance.

When the short-circuiting starts at a time 0, a current amplitude value $I_s$ reaches a predetermined value ($I_{s1}$) as time elapses. The time when the current amplitude value Is reaches the predetermined value ($I_{s1}$) is made $T_1$. $\theta_s$, $i_d$ and $i_q$ at the time $T_1$ are made $\theta_{s1}$, $i_{d1}$, and $i_{q1}$, respectively, and $i_d$, and $i_q$ at a time $2T_1$ of twice $T_1$ are made $i_{d2}$ and $i_{q2}$, respectively. At this time, $i_{d1}$, $i_{q1}$, $i_{d2}$ and $i_{q2}$ are expressed by expression (9) and expression (10).

$$\begin{pmatrix} i_{d1} \\ i_{q1} \end{pmatrix} = \frac{\phi}{L_q} \begin{pmatrix} k(\cos\theta_{s1} - 1) \\ -\sin\theta_{s1} \end{pmatrix} \quad (9)$$

$$\begin{pmatrix} i_{d2} \\ i_{q2} \end{pmatrix} = \frac{\phi}{L_q} \begin{pmatrix} k(\cos 2\theta_{s1} - 1) \\ -\sin 2\theta_{s1} \end{pmatrix} \quad (10)$$

Figure 3:
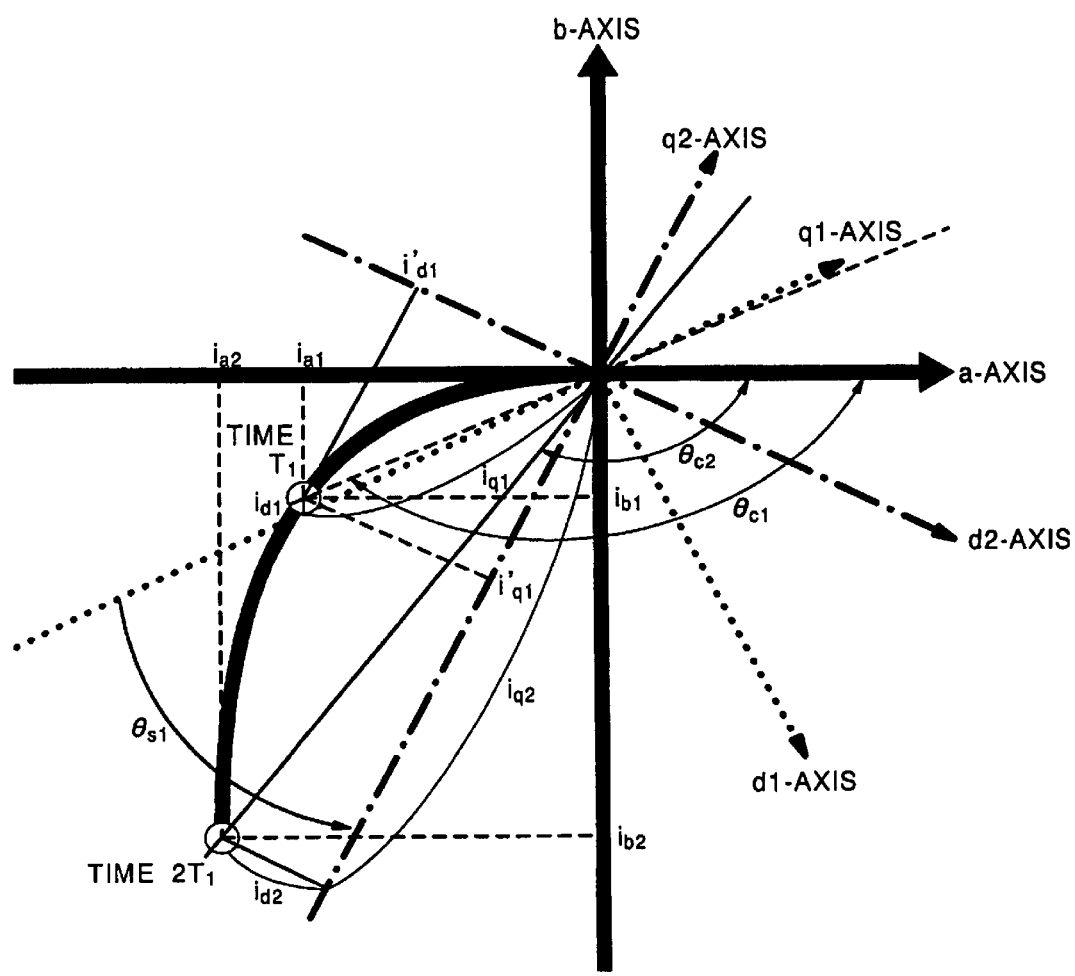
FIG. 3 is an explanatory view for explaining an operation of the rotation speed and rotation position detecting apparatus of the synchronous motor according to the embodiment 1.

Values of $i_{d1}$ and $i_{q1}$ observed on the d-q axis ($d_2$-$q_2$ axis) at the time $2T_1$ are made $i'_{d1}$ and $i'_{q1}$ the relation of these is shown in FIG. 3.

Since the phase difference at the time $T_1$ between the d-q axis ($d_1$-$q_1$ axis) and the $d_2$-$q_2$ axis is $\theta_{s1}$, when $i_{d1}$ and $i_{q1}$ are observed on the d-q axis at the time ($2 \times T_1$), $i'_{d1}$ and $i'_{q1}$ exhibited by expression (11) are obtained.

$$\begin{pmatrix} i'_{d1} \\ i'_{q1} \end{pmatrix} = \begin{pmatrix} \cos\theta_{s1} & \sin\theta_{s1} \\ -\sin\theta_{r1} & \cos\theta_{r1} \end{pmatrix} \begin{pmatrix} i_{d1} \\ i_{q1} \end{pmatrix} \quad (11)$$

Here, in the case where $\theta_s$ is sufficiently small, $\sin \theta_s$ and $\cos \theta_s$ can be approximated by expressions (12) and (13).

$$\cos\theta_s \cong 1 - \frac{\theta_s^2}{2} \quad (12)$$

$$\sin\theta_s \cong \theta_s \quad (13)$$

From the expressions (12) and (13), $i_{d1}$, $i_{q1}$, $i_{d2}$, $i_{q2}$, $i'_{d1}$ and $i'_{q1}$ are given by expressions (14), (15) and (16).

$$\begin{pmatrix} i_{d1} \\ i_{q1} \end{pmatrix} = -\frac{\phi}{L_q} \begin{pmatrix} \frac{k\theta_{s1}^2}{2} \\ \theta_{s1} \end{pmatrix} \quad (14)$$

$$\begin{pmatrix} i_{d2} \\ i_{q2} \end{pmatrix} = -\frac{2\phi}{L_q} \begin{pmatrix} k\theta_{s1}^2 \\ \theta_{s1} \end{pmatrix} \quad (15)$$

$$\begin{pmatrix} i'_{d1} \\ i'_{q1} \end{pmatrix} = -\frac{\phi}{L_q} \begin{pmatrix} -\left(1+\frac{k}{2}\right)\theta_{s1}^2 + \frac{k\theta_{s1}^4}{4} \\ -\theta_{s1} + \frac{k+1}{2}\theta_{s1}^3 \end{pmatrix} \quad (16)$$

When an observation on the $d_2$-$q_2$ axis is made, if the outer product of a current vector ($i'_{d1}$, $i'_{q1}$) at the time $T_1$ and a current vector ($i_{d2}$, $i_{q2}$) at the time $2T_1$ is calculated, expression (17) is obtained.

$$\begin{pmatrix} i_{d2} \\ i_{q2} \end{pmatrix} \times \begin{pmatrix} i'_{d1} \\ i'_{q1} \end{pmatrix} = \left(\frac{\phi}{L_q}\right)^2 \left(2 - k\left(1 - \left(k + \frac{1}{2}\right)\theta_s^2\right)\right)\theta_s^3 \quad (17)$$

Here, since $1 \gg (k+1/2)\theta_s^2$, and the value of the outer product of the current vector at the time $T_1$ and the current vector at the time ($2 \times T_1$) observed on the $d_2$-$q_1$ axis is the same as that observed on the rest coordinate axis (a-b axis), expression (18) is established.

$$\begin{pmatrix} i_{d2} \\ i_{q2} \end{pmatrix} \times \begin{pmatrix} i'_{d1} \\ i'_{q1} \end{pmatrix} = \begin{pmatrix} i_{a2} \\ i_{b2} \end{pmatrix} \times \begin{pmatrix} i_{a1} \\ i_{b1} \end{pmatrix} = \left(\frac{\phi}{L_q}\right)^2 (2-k)\theta_s^3 \quad (18)$$

According to the expression (18), if the salient pole ratio k is known, as shown in expression (19) and expression (20), from a sign of the value of the outer product of the current vector ($i_{a2}$, $i_{b2}$) and ($i_{a1}$, $i_{b1}$), a sign of $\theta_s$ can be judged.

In the case of k<2, $$\begin{pmatrix} i_{a2} \\ i_{a2} \end{pmatrix} \times \begin{pmatrix} i_{a1} \\ i_{a1} \end{pmatrix} > 0 \iff \theta_s > 0 \quad (19)$$

$$\begin{pmatrix} i_{a2} \\ i_{a2} \end{pmatrix} \times \begin{pmatrix} i_{a1} \\ i_{a1} \end{pmatrix} < 0 \iff \theta_s < 0$$

In the case of k>2, $$\begin{pmatrix} i_{a2} \\ i_{a2} \end{pmatrix} \times \begin{pmatrix} i_{a1} \\ i_{a1} \end{pmatrix} > 0 \iff \theta_s < 0 \quad (20)$$

$$\begin{pmatrix} i_{a2} \\ i_{a2} \end{pmatrix} \times \begin{pmatrix} i_{a1} \\ i_{a1} \end{pmatrix} < 0 \iff \theta_s > 0$$

On the other hand, the relation of expression (21) is established between the phase $\theta_c$ and the current amplitude value $$I_s = \frac{\phi}{L_q}\sqrt{k(\cos\theta_s - 1)^2 + \sin^2\theta_s} \quad (21)$$

Figure 4:
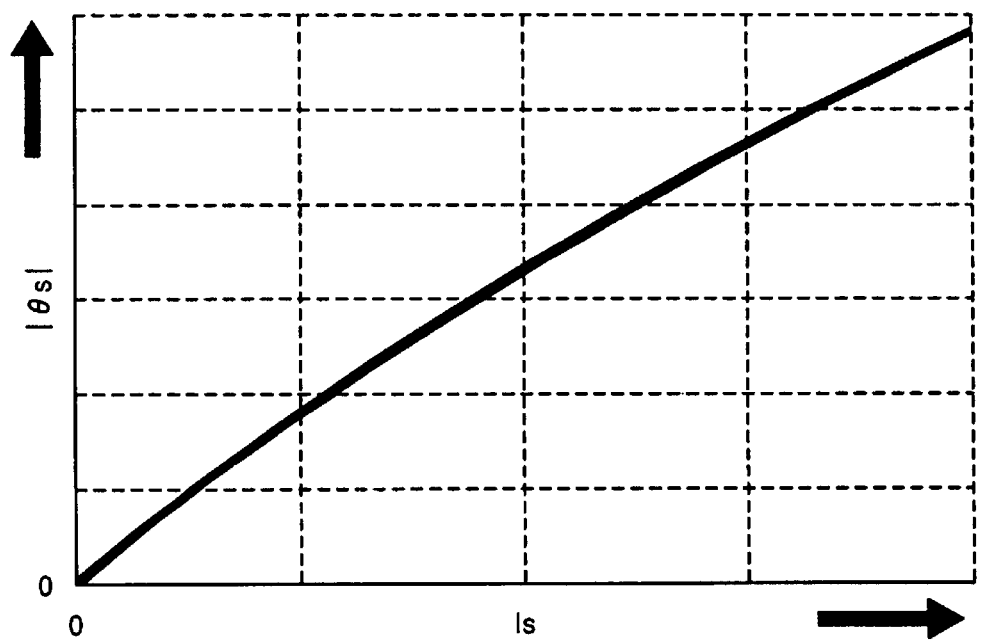
FIG. 4 is a view showing a relation between a current amplitude value $I_s$ and $|\theta_s|$ according to the embodiment 1.

FIG. 4 is a view in which the relation of the expression (21) is plotted, and it is understood that $|\theta_s|$ is uniquely determined from the current amplitude value $I_s$. Then, the absolute value of the phase uniquely determined from the predetermined current amplitude value (=$I_{s1}$) is made $|\theta_{s1}|$. When a period of time from the start of short-circuiting to a point of time when the current amplitude value $I_d$ reaches $I_{s1}$ is made $T_1$ (>0), expression (22) is established.

$$|\omega| = \frac{|\theta_{s1}|}{T_1} \quad (22)$$

That is, the calculation means 2a outputs a plurality of trigger signals on one occurrence of short-circuiting to obtain current values from the detection means 4 plural times, calculates the current amplitude value $I_s$ in regard to the current value obtained from the detection means 4 each time when the trigger signal is outputted, measures the time $T_1$ when the current amplitude value $I_s$ reaches the predetermined current amplitude value $I_{s1}$, and divides the predetermined value $|\theta_{s1}|$ corresponding to $I_{s1}$ by $T_1$, so that the absolute value $|\omega|$ of the rotation speed can be obtained. Besides, the currents $i_a$ and $i_b$ on the a-b axis at the time $T_1$ are stored as $i_{a1}$ and $i_{b1}$, and continuously, all-phase short-circuiting is continued, and the currents $i_a$ and $i_b$ on the a-b axis at the time $2\times T_1$ are stored as $i_{a2}$ and $i_{b2}$. Then, when the expression (19) or (20) is used, the sign of $\theta_{s1}$ can be judged, and the sign of the rotation speed can be judged from this.

From the above, the rotation speed $\omega$ can be detected through only the one occurrence of short-circuiting.

Next, detection of the rotation position $\theta$ will be described.

As described above, the absolute value $|\theta_{s1}|$ of the phase uniquely determined from the predetermined current amplitude value $I_{s1}$ is known. Accordingly, from the expression (9), $i_{d1}$ and $i_{q1}$ are given as expressed by equation (23).

$$|i_{d1}| = -\frac{\phi}{L_q}k(\cos|\theta_{s1}| - 1) \quad (23)$$

$$|i_{q1}| = -\frac{\phi}{L_q}\sin|\theta_{s1}|$$

The relation of expression (24) is established between the current phase $\theta_{c1}$ and the rotation position $\theta$ at the time $T_1$.

$$\theta = \theta_{c1} - sign(\omega)\Delta\theta \ldots k < 2 \quad (24)$$

$$\theta = \theta_{c1} + sign(\omega)\Delta\theta \ldots k > 2$$

$$\Delta\theta = \tan^{-1}\left|\frac{i_{q1}}{i_{d1}}\right|$$

Here, it is understood from the expression (23) that $\Delta\theta$ is a value which can be uniquely given from $|\theta_{s1}|$. The rotation position $\theta$ can be obtained according to this expression.

Figure 5:
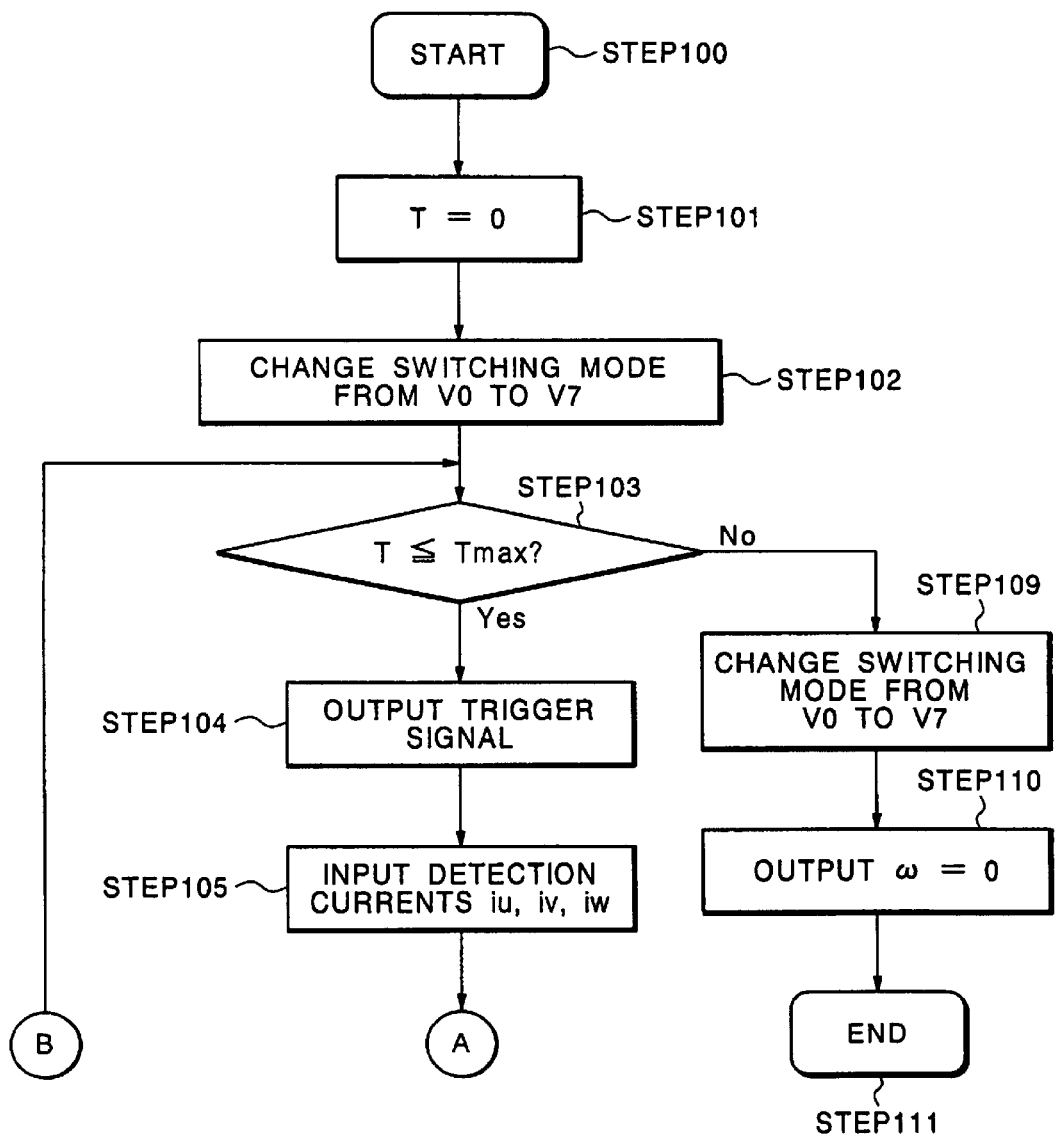
FIGS. 5, 6, 7, and 8 are flowcharts showing an operation in the rotation speed and rotation position detecting apparatus of the synchronous motor according to the embodiment 1.
Figure 6:
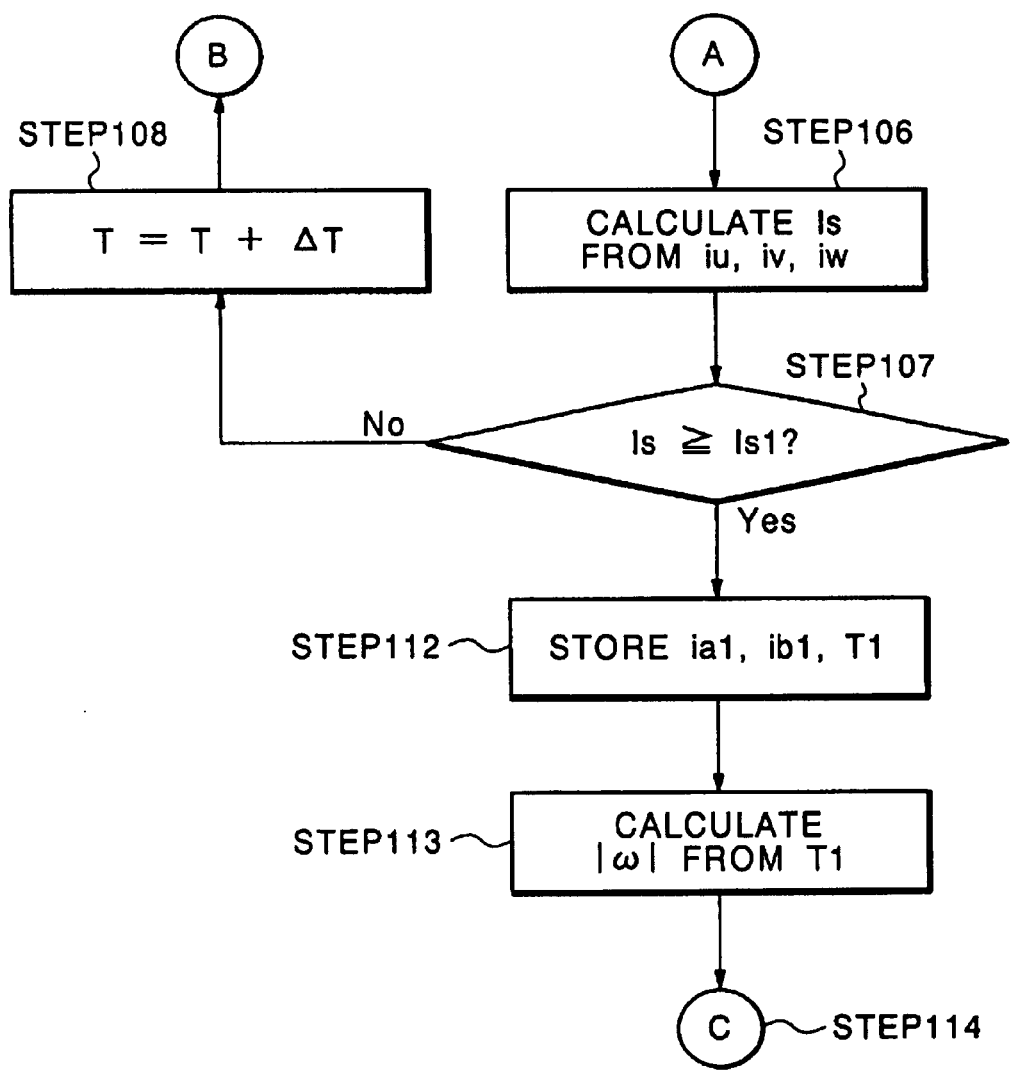

FIG. 5 and FIG. 6 are flowcharts of a program stored in the memory 20a.

First, the program starts at STEP 100, and the time T is set to 0 at STEP 101. At STEP 102, the calculation means 2a changes the switching mode outputted to the circuit means 3 from V0 in which a current initial value becomes 0 to V7 in which all-phase short-circuiting occurs. At STEP 103, it is judged whether present time T does not exceed previously set maximum time $T_{max}$. In the case where the present time T does not exceed the maximum time $T_{max}$, a trigger signal is outputted from the calculation means 2a to the detection means 4 at STEP 104, and the detection means 4 detects a current at the time of rising of the trigger signal. At STEP 105, the currents $i_u$, $i_v$ and $i_w$ detected by the detection means 4 are inputted to the input circuit 18. At STEP 106, $i_a$ and $i_b$ are calculated on the basis of the expression (7), and the current amplitude value $I_d$ is calculated on the basis of $i_a$, $i_b$ and the expression (3). At STEP 107, it is judged whether the current amplitude value $I_s$ calculated at STEP 106 reaches the predetermined value $I_{s1}$. In the case where the current amplitude value $I_s$ does not reach the predetermined value $I_{s1}$, a sampling period $\Delta T$ is added to the time T at STEP 108, and after the sampling period $\Delta T$ has elapsed from the time 0, the calculation subsequent to the STEP 103 is again carried out. Note that, at the STEP 103, in the case where it is judged that the present time T exceeds the previously set maximum time $T_{max}$, at STEP 109, the calculation means 2a changes the switching mode outputted to the circuit means 3 from V7 in which all-phase short-circuiting occurs to V0 in which the current is made 0. If the current amplitude value $I_s$ does not reach the predetermined value $I_{s1}$ even after the time T passes through $T_{max}$, it can be judged that an induced voltage due to the idle state is not generated. Thus, at STEP 110, the rotation speed $\omega$ is made 0 and is outputted, and the program is ended at STEP 111. If $\omega=0$ is found, it is possible to start the driving of the synchronous motor 1 from the stop state by a well-known method.

In the case where the current amplitude value $I_s$ reaches $I_{s1}$ at the STEP 107, at STEP 112, the time T is stored as time $T_1$ when the current amplitude value $I_s$ reaches $I_{s1}$, and $i_a$ and $i_b$ calculated at the STEP 106 are stored as $i_{a1}$ and $i_{a2}$. As described above, the absolute value $|\theta_{s1}|$ of the phase corresponding to the predetermined current amplitude value $I_{s1}$ is uniquely determined. Then, at STEP 113, on the basis of $|\theta_{s1}|$ prepared as the predetermined value and the above time $T_1$, the calculation of the expression (22) is carried out, and $|\omega|$ is stored in the memory 20a.

Figure 7:
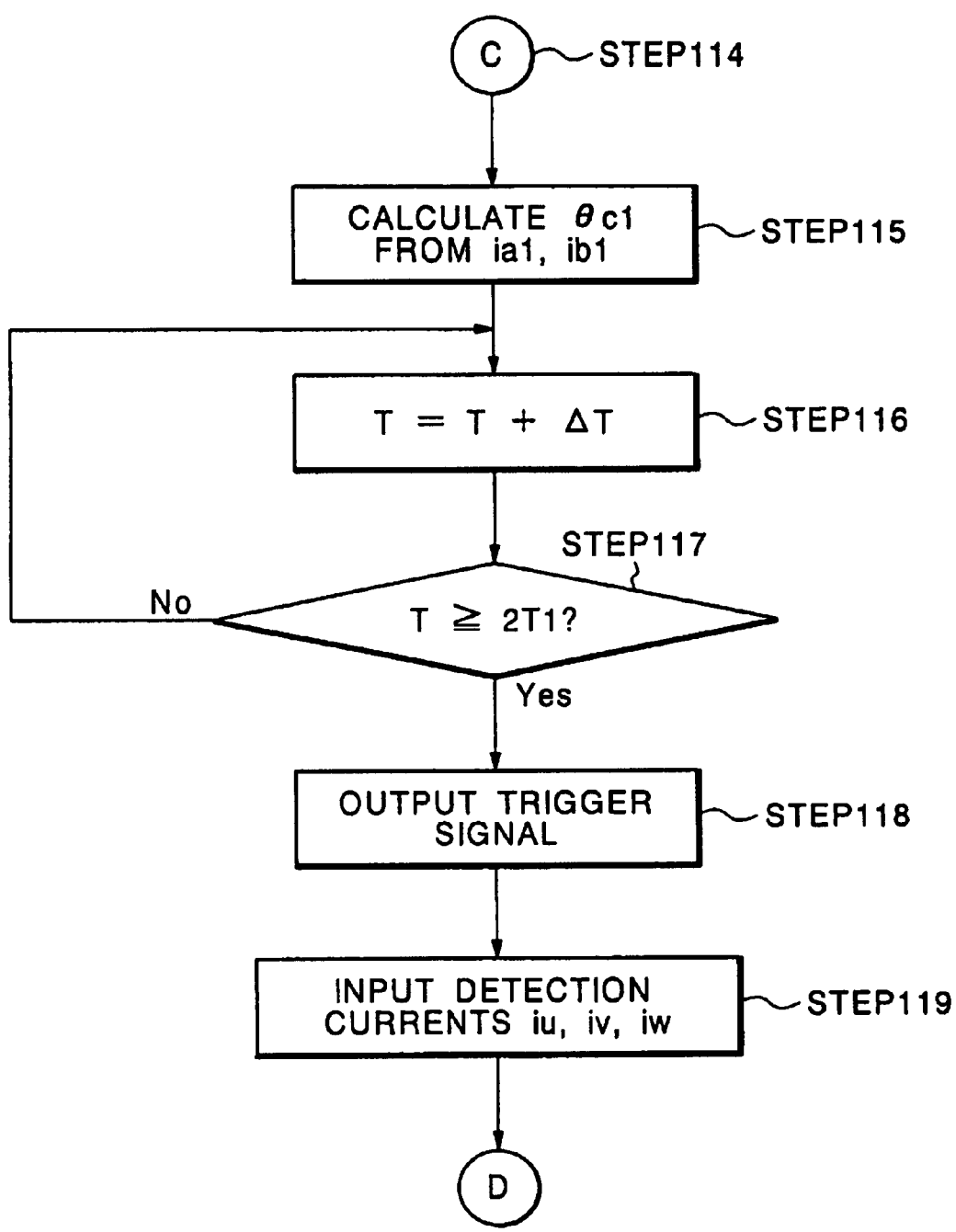
Figure 8:
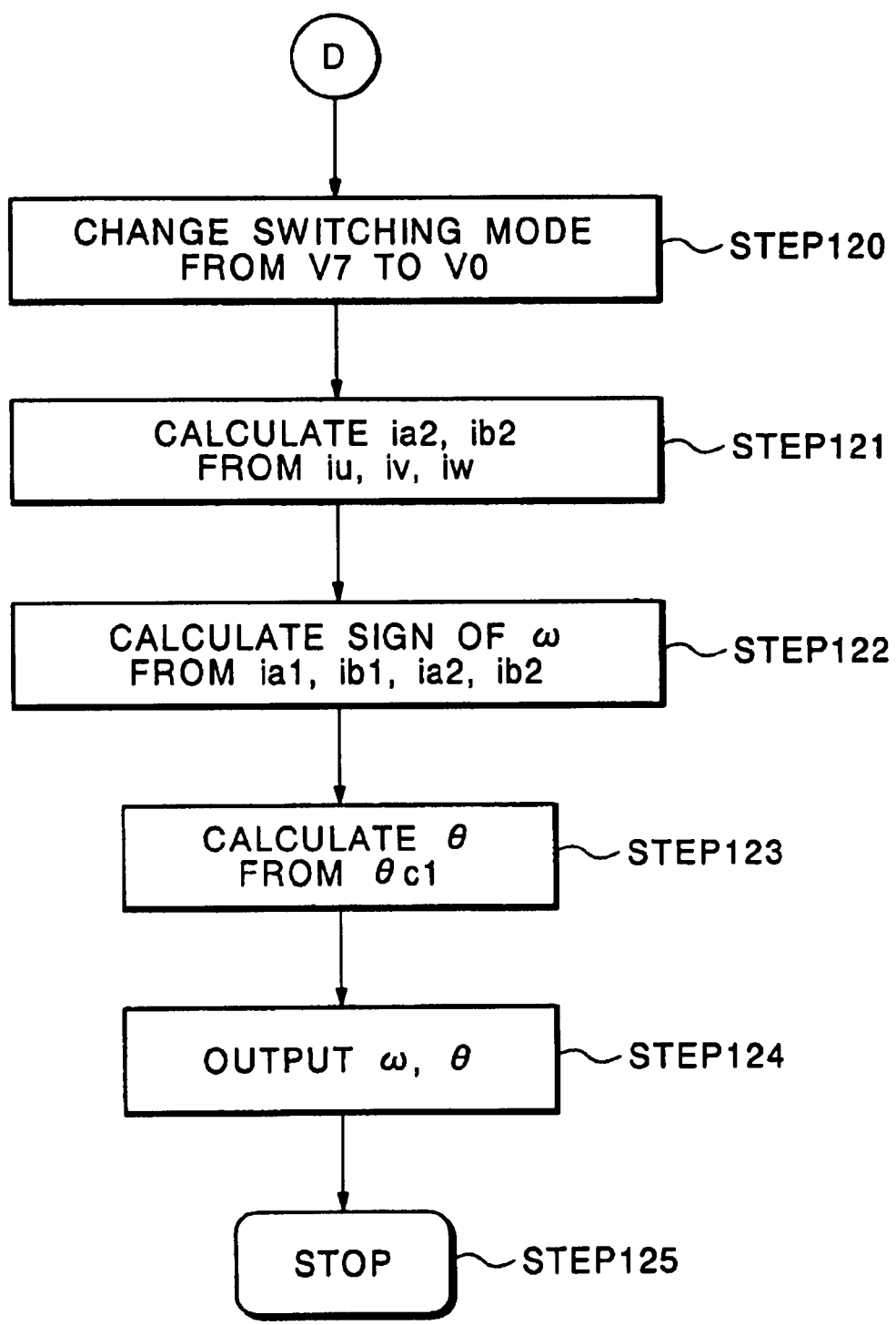

FIG. 7 and FIG. 8 are flowcharts of the program subsequent to the STEP 114 at which storing in the memory 20a is carried out.

At STEP 115, on the basis of the current phases $i_{a1}$ and $i_{b1}$, the current phase $\theta_{c1}$ at the time $T_1$ is calculated by a method described later. At STEP 116, the sampling period $\Delta T$ is added to the time T, and after the sampling period $\Delta T$ has elapsed, the processing of STEP 117 is carried out. At the STEP 117, it is judged whether present time T reaches $2\times T_1$, and in the case where it does not reach, the processing of STEP 116 is carried out. In the case where the time T reaches $2\times T_1$, at STEP 118, a trigger signal is outputted from the calculation means 2a to the detection means 4, and the detection means 4 detects a current at the time of rising of the trigger signal. Then, currents $i_u$, $i_v$ and $i_w$ detected by the detection means 4 at STEP 119 are inputted to the input circuit 18. At STEP 120, the calculation means 2a changes the switching mode outputted to the circuit means 3 from V7 in which all-phase short-circuiting occurs to V0 in which current is made 0. At STEP 121, $i_a$ and $i_b$ are calculated on the basis of the expression (7), and $i_a$ and $i_b$ are stored as $i_{a2}$ and $i_{b2}$, respectively. At STEP 122, in the case where the salient pole ratio k, which is a value intrinstic to the synchronous motor 1 is smaller than 2, the sign of the rotation speed $\omega$ is judged according to the expression (19). Further, in the case where the salient pole ratio k is larger than 2, the sign of the rotation speed ω is judged by the expression (20). At STEP 123, on the basis of the predetermined value Δθ, the expression (24), and the current phase $\theta_{c1}$, the rotation position θ is calculated. At STEP 124, the rotation speed ω and the rotation position ω are outputted from the output circuit 23, and the program is ended at STEP 125.

Next, a method of calculating the current phase $\theta_{c1}$ from the currents $i_{a1}$ and $i_{b1}$, which is applied at the STEP 115, will be described.

First, calculation currents $i_{x1}$ and $i_{y1}$ using the currents $i_{a1}$ and $i_{b1}$ on the a-b coordinate axis are defined by expression (25).

$$i_{x1} = \frac{i_{a1} + i_{b1}}{2}$$
$$i_{y1} = \frac{i_{a1} - i_{b1}}{2}$$
(25)

Figure 9:
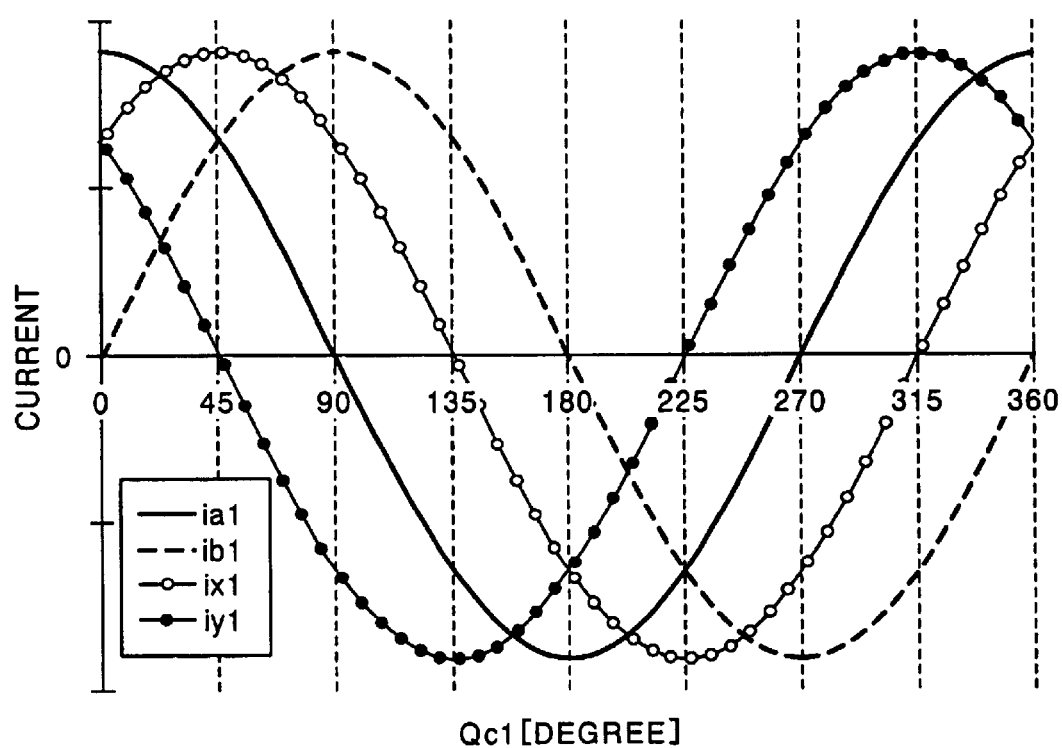
FIG. 9 is an explanatory view for explaining a method of calculation of rotation position in the rotation speed and rotation position detecting apparatus of the synchronous motor according to the embodiment 1.

FIG. 9 shows the relations between the current phase $\theta_c$ and the calculation currents $i_{a1}$, $i_{b1}$, $i_{x1}$ and $i_{y1}$.

From FIG. 9, it is understood that the sign of any one of $i_{a1}$, $i_{b2}$, $i_{x1}$ and $i_{y1}$ is changed at intervals of 45 degrees with respect to $\theta_{c1}$. For example, in the case where $\theta_{c1}$ is within the range of 0 to 45 degrees, $i_{a1}>0$, $i_{b1}>0$, $i_{x1}>0$, and $i_{y1}>0$, and in the case where $\theta_{c1}$ is within the range of 45 to 90 degrees, $i_{a1}>0$, $i_{b1}>0$, $i_{x1}>0$, and $i_{y1}<0$.

Then, in the case of $i_{a1}>0$, $i_{b1}>0$, $i_{x1}>0$, and $i_{y}>0$, if $\theta_{c1}$ is made 22.5 degrees of the center value of 0 to 45 degrees, $\theta_{c2}$ has accuracy within the range of ±22.5 degrees.

Figure 10:
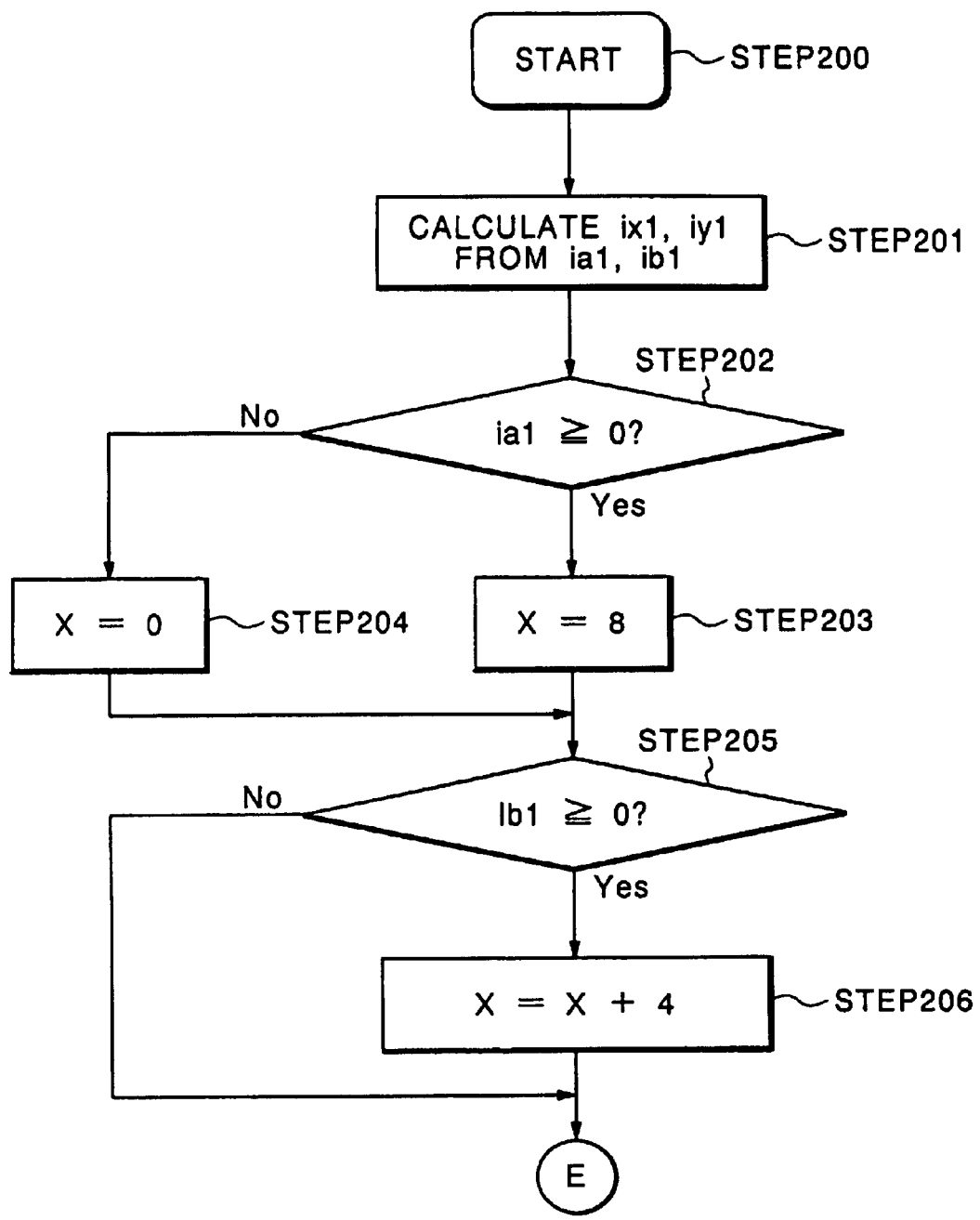
FIG. 10 and FIG. 11 are flowcharts showing an operation in the rotation speed and rotation position detecting apparatus of the synchronous motor according to the embodiment 1.
Figure 11:
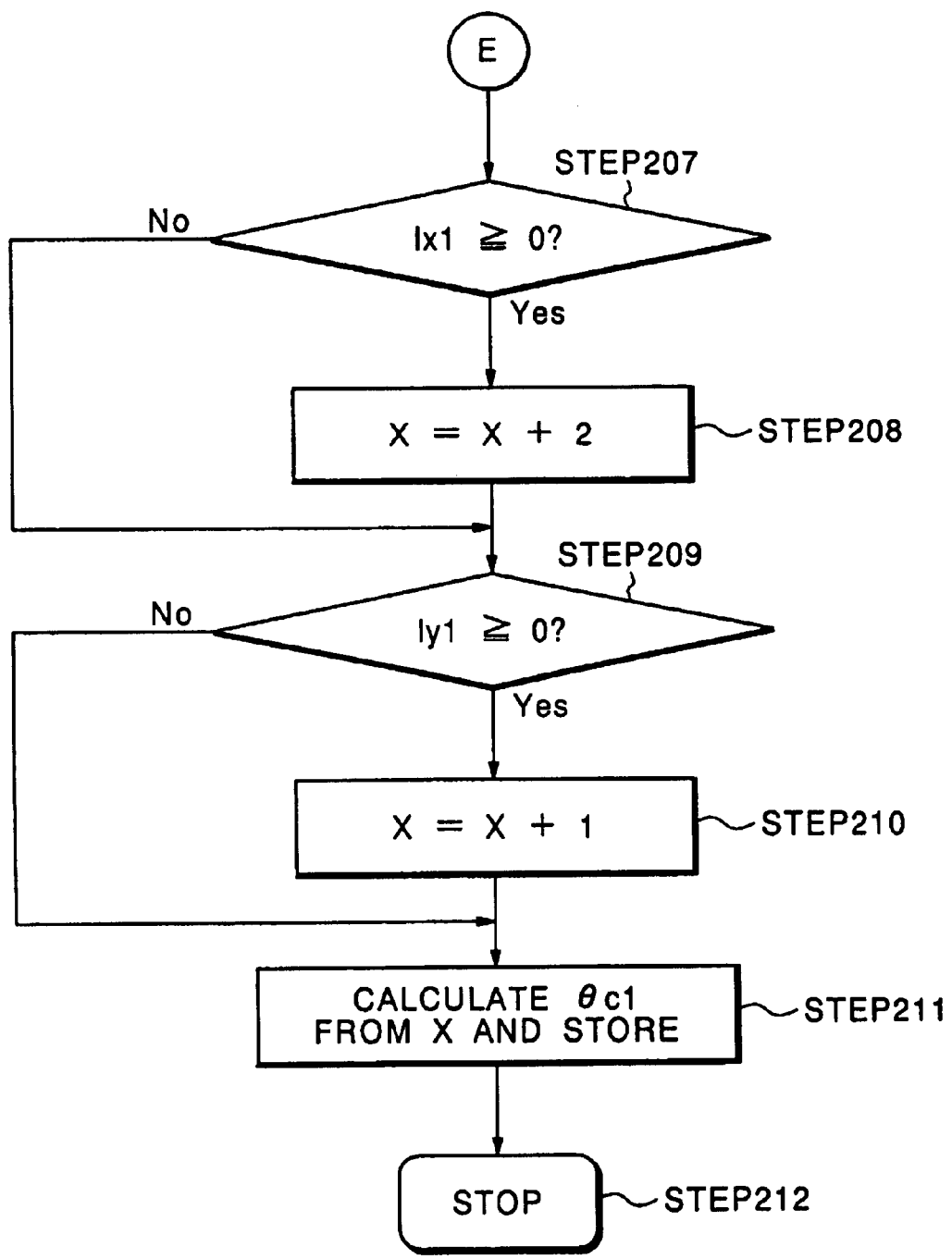

FIG. 10 and FIG. 11 are flowcharts of a program processed at the STEP 115.

The calculation of $\theta_{c1}$ starts from STEP 200, and at STEP 201, the calculation currents $i_{x1}$ and $i_{y1}$ are calculated using the currents $i_{a1}$ and $i_{b1}$ according to the expression (25). At STEP 202, the sign of $i_{a1}$ is judged. In the case where the sign of $i_{a1}$ is positive, the processing of STEP 203 is carried out, and in the case where the sign of $i_{a1}$ is negative, the processing of STEP 204 is carried out. At the STEP 203, the value of a variable X is set to 8, and the procedure proceeds to the processing of STEP 205. At the STEP 204, the value of the variable x is set to 0, and the procedure proceeds to the processing of the STEP 205. At the STEP 205, the sign of $i_{b1}$ is judged. In the case where the sign of $i_{b1}$ is positive, the processing of STEP 206 is carried out, and in the case where the sign of $i_{b1}$ is negative, the processing of the STEP 206 is omitted, and the procedure proceeds to the processing of STEP 207. At the STEP 206, four is added to the variable X. At the STEP 207, the sign of $i_{x1}$ is judged. In the case where the sign of $i_{x1}$ is positive, the processing of STEP 208 is carried out, and in the case where the sign of $i_{x1}$ is negative, the processing of the STEP 208 is omitted and the procedure proceeds to the processing of STEP 209. At the STEP 208, two is added to the variable X. At the STEP 209, the sign of $i_{y1}$ is judged. In the case where the sign of $i_{y1}$ is positive, the processing of STEP 210 is carried out, and in the case where the sign of $i_{y1}$ is negative, the processing of the STEP 210 is omitted, and the procedure proceeds to the processing of STEP 211. At the STEP 210, one is added to the variable X.

It is understood that tables shown in FIGS. 12(a) and 12(b) are established between the variable x obtained in this way and the current phase $\theta_{c1}$.

At STEP 211, by referring to the previously prepared tables shown in FIG. 12, $\theta_{c1}$ is obtained from the obtained variable X, the result is stored, and the program is ended at STEP 212. It is possible to obtain $\theta_{c1}$ through the above processing.

Figure 13:
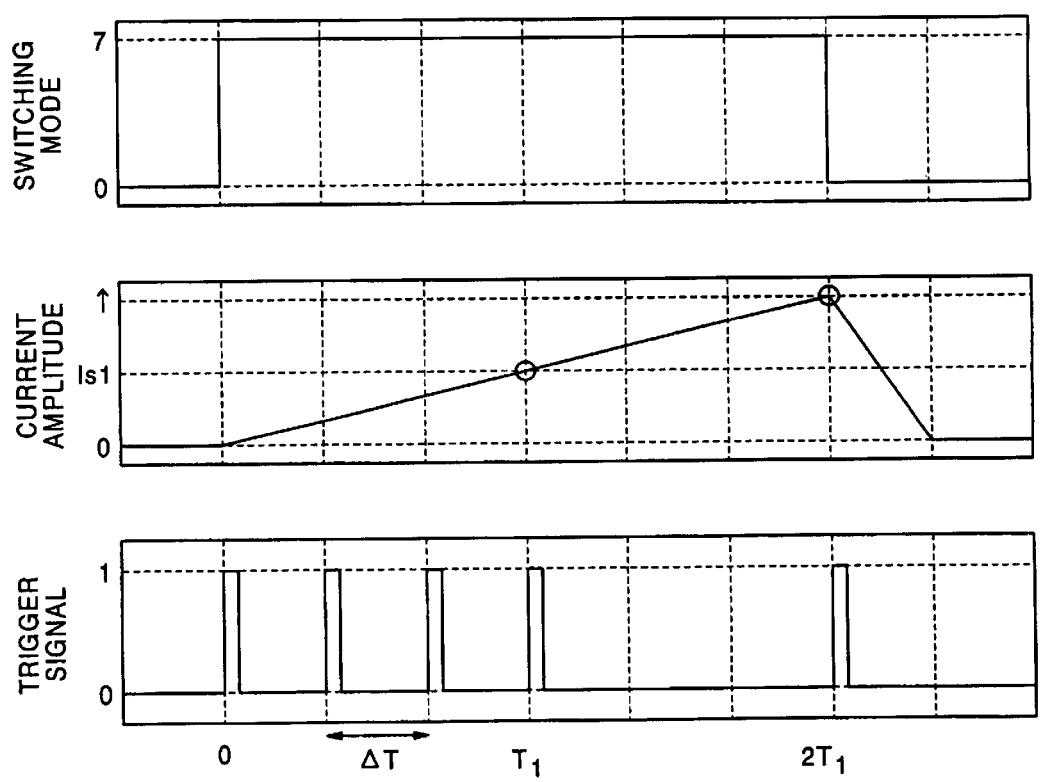
FIG. 13 is an explanatory view for explaining an operation in the rotation speed and rotation position detecting apparatus of the synchronous motor according to the embodiment 1.

FIG. 13 is a view showing an example of relations of, with respect to the time, the switching mode outputted by the calculation means 2a to the circuit means 3, the current amplitude value $I_s$ calculated from the detected current value, and the trigger signal outputted by the calculation means 2a to the detection means 4. In FIG. 13, the calculation means 2a changes the switching mode, which has been outputted from the output circuit 21 to the circuit means 3, from V0 to V7. The calculation means 2a outputs the trigger signal to the detection means 4 at intervals of sampling period ΔT, and the detection means 4 outputs the current detected at the time of rising of the trigger signal to the calculation means 2. The current amplitude value $I_s$ calculated from the current value reaches the predetermined value ($I_{s1}$) as the time elapses. The time when the current amplitude value $I_s$ reaches the predetermined value ($I_{s1}$) is made $T_1$. Then, at time $2T_1$, the calculation means 2a changes the switching mode outputted to the circuit means 3 from V7 to V0, and simultaneously outputs the trigger signal. The detection means 4 outputs respective currents of U, V and W phases at rising time $2T_1$ of the trigger signal to the calculation means 2a. After the circuit means 3 outputs the switching mode V0, in the inside of the circuit means 3, the currents flowing through the respective phases flow in the direction to charge the DC voltage source 11, and the value of the current of the synchronous motor 1 is returned to 0.

According to this embodiment, since the rotation speed ω and the rotation position θ can be detected through one occurrence of short-circuiting, a starting time can be shortened as compared with the conventional apparatus in which short-circuiting is carried out twice.

Besides, since the current detection is carried out at the time when the current amplitude value $I_s$ reaches the predetermined value, irrespective of the magnitude of the rotation speed, it becomes possible to detect the rotation speed and the rotation position with accuracy and without receiving the influence of detection noise, cancellation of significant digit of the AD converter, or the like. Naturally, since it is not necessary to again carry out the detection after a short circuit period is again set long, the detection time can also be shortened.

Besides, in the process of calculating the rotation position θ, since the phase difference between the rotation position θ and the current phase $\theta_{c1}$ when the current amplitude value $I_s$ reaches the predetermined value is a constant value, the value has only to be stored as Δθ in advance, and complicated calculation using an arc tangent function as in the conventional apparatus is not required.

Embodiment 2

In the embodiment 1, although the current phase $\theta_{c1}$ has the accuracy within the range of ±22.5 degrees, the accuracy of the current phase $\theta_{c1}$ can be improved by further introducing variables using currents $i_{a1}$ and $i_{b1}$ on the a-b coordinate axis.

Calculation currents $i_{ay1}$, $i_{ax1}$, $i_{xb1}$, and $i_{by\cdot1}$ are defined by expression (26).

$$i_{ayI} = G_1(i_{aI} - i_{yI}) \quad (26)$$
$$i_{axI} = G_1(i_{aI} - i_{xI})$$
$$i_{xbI} = G_1(i_{xI} - i_{bI})$$
$$i_{byI} = G_1(i_{bI} + i_{yI})$$
$$G_1 = \frac{1}{2\sin\frac{\pi}{8}}$$

Figure 14:
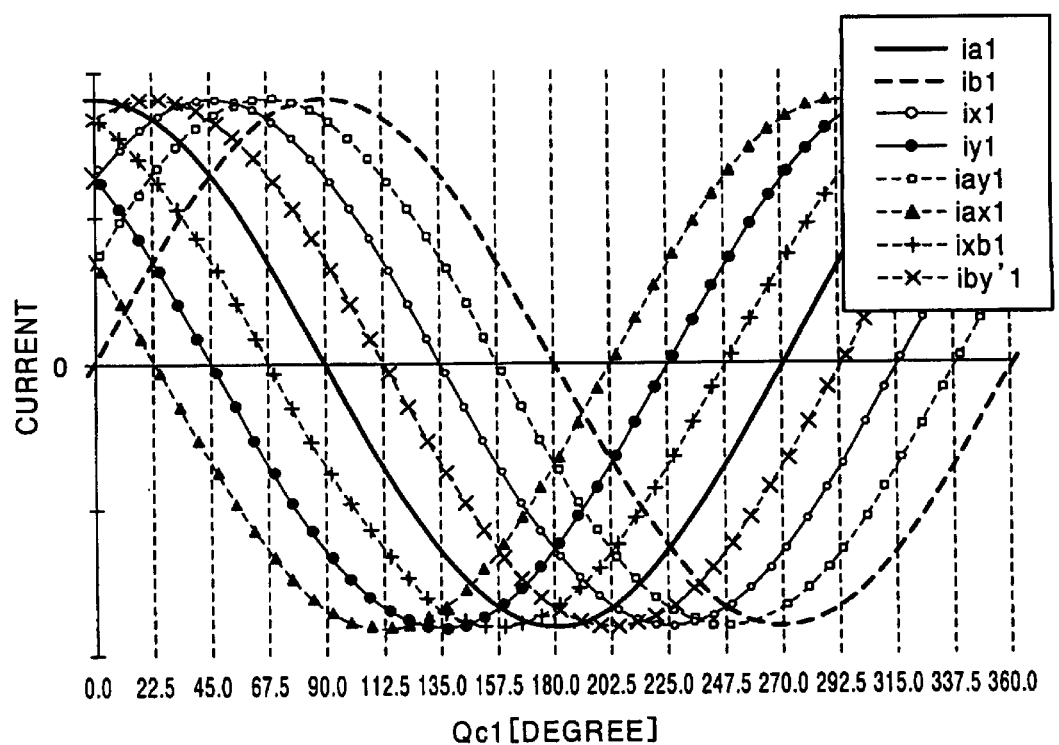
Figure 18:
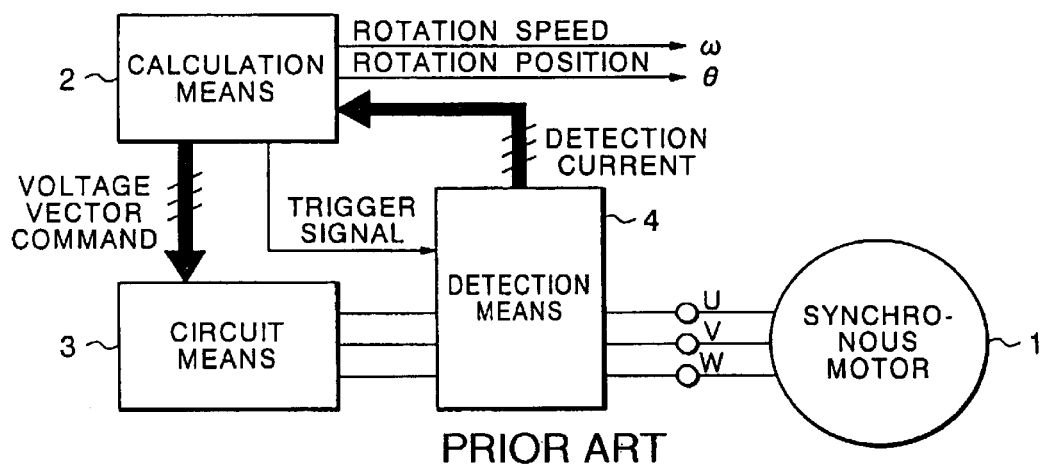
FIG. 18 is a block diagram of a conventional rotation speed and rotation position detecting apparatus of a synchronous motor.
Figure 19:
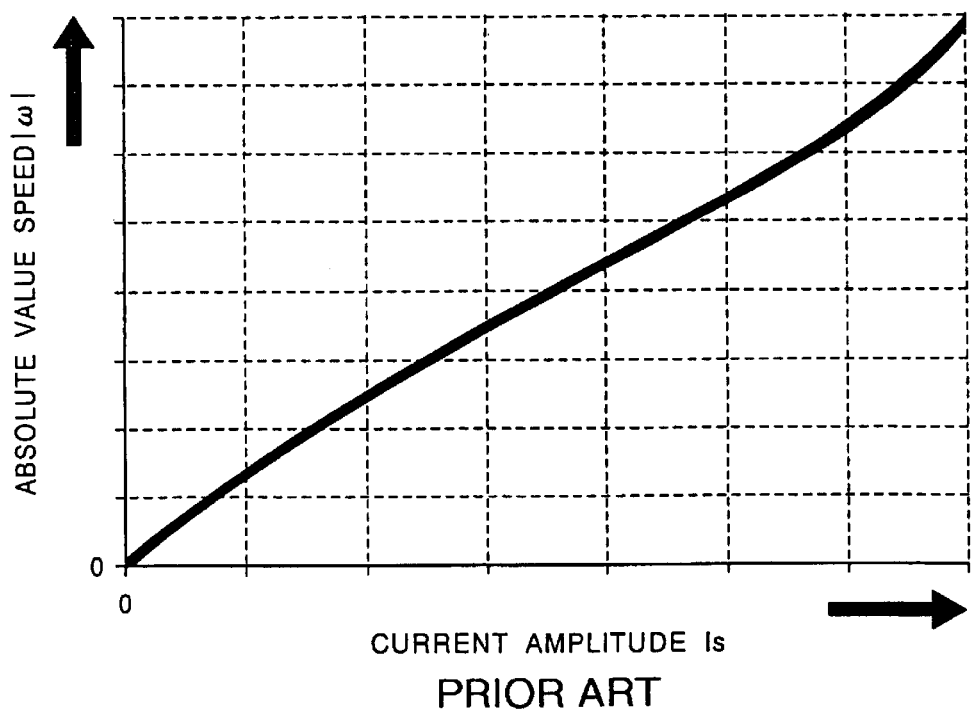
FIG. 19 is a view showing a relation between a current amplitude value $I_{s7}$ and $|\omega|$ in the conventional rotation speed and rotation position detecting apparatus of the synchronous motor.
Figure 20:
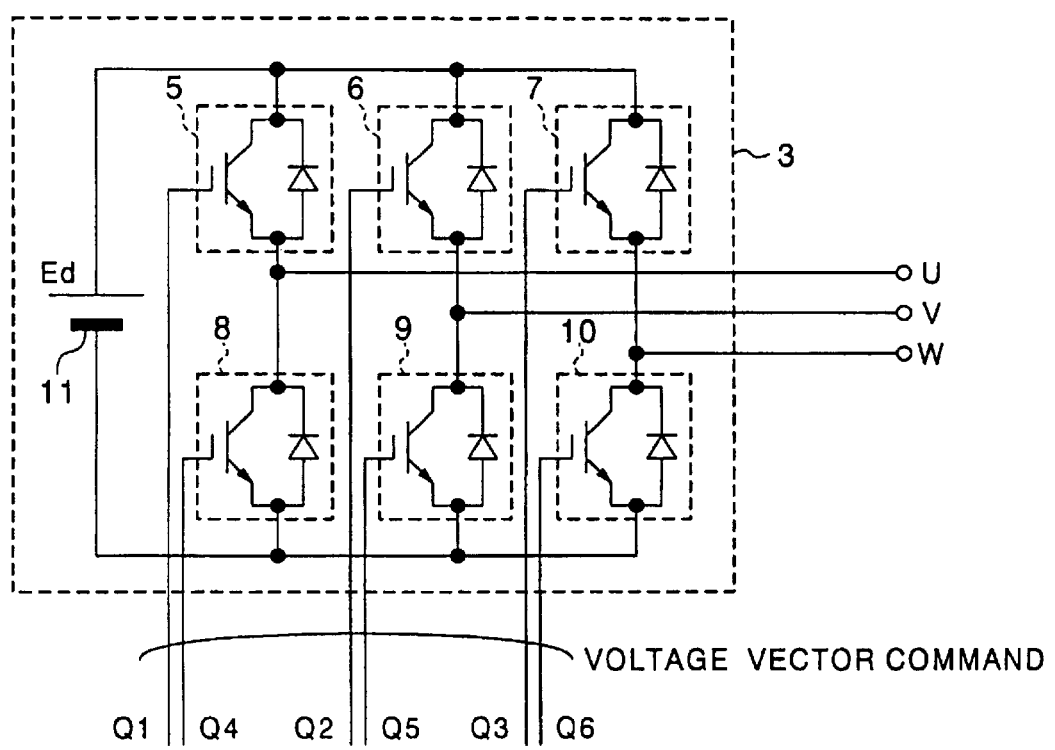
FIG. 20 is a structural view showing a circuit structure of circuit means.
Figure 21:
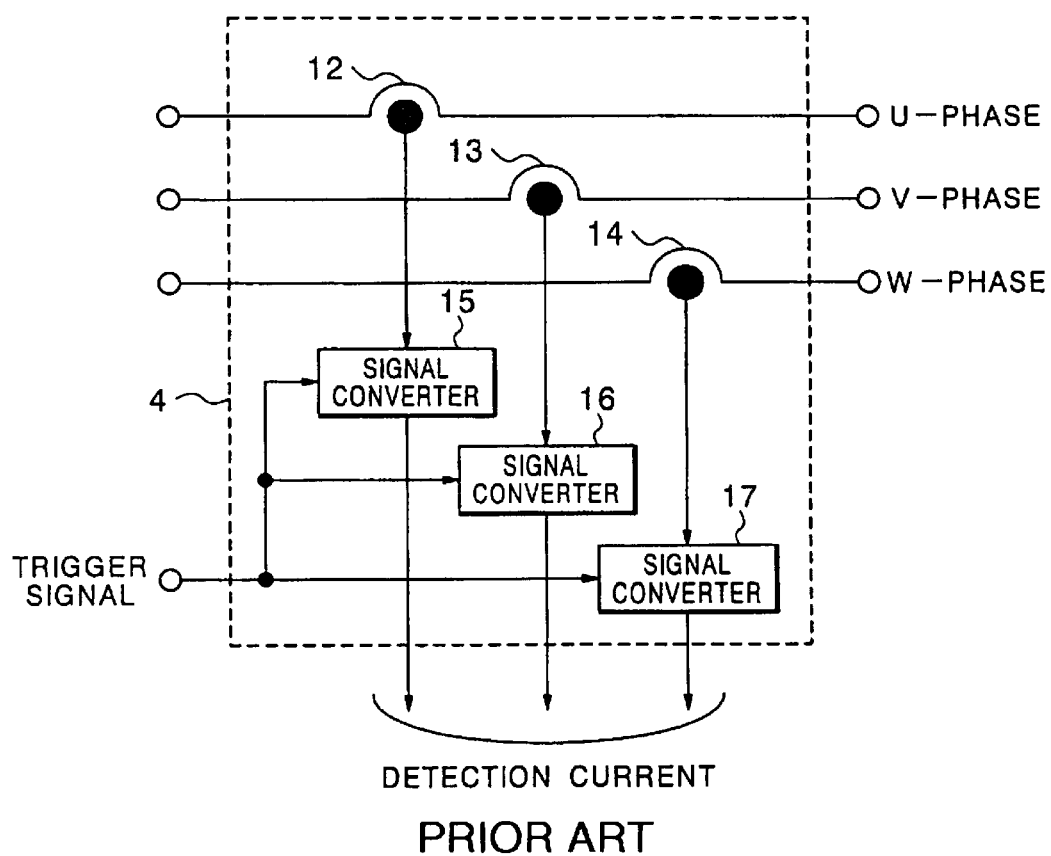
FIG. 21 is a structural view showing a circuit structure of detection means.

FIG. 14 shows relations between the current phase $\theta_{c1}$ and the calculation currents $i_{a1}$, $i_{b1}$, $i_{x1}$, iy1, $i_{ay1}$, $i_{ax1}$, $i_{xb1}$ and $i_{by\cdot1}$. From the view, it is understood that the sign of any one of $i_{a1}$, $i_{b1}$, $i_{x1}$, iy1, $i_{ay1}$, $i_{ax1}$, $i_{xb1}$ and $i_{by\cdot1}$ is changed at intervals of 22.5 degrees. For example, $\theta_{c1}$ is within the range of 0 to 22.5 degrees, $i_{a1}>0$, $i_{b1}>0$, $i_{x1}>0$, $i_{y1}>0$, $i_{ay1}>0$, $i_{ax1}>0$, $i_{xb1}>0$, and $i_{by\cdot1}>0$, and in the case where $\theta_{c1}$ is within the range of 22.5 to 45 degrees, $i_{a1}>0$, $i_{b1}>0$, $i_{x1}<0$, $i_{y1}>0$, $i_{ay1}>0$, $i_{ax1}>0$, $i_{xb1}>0$, and $i_{by\cdot1}>0$. Accordingly, in the case of $i_{a1}>0$, $i_{b}>0$, $i_{x1}>0$, $i_{y1}>0$, $i_{ay1}>0$, $i_{ax1}>0$, $i_{xb1}>0$, and $i_{by\cdot1}>0$, if $\theta_{c1}$ is made 11.25 degrees of the center value of 0 to 22.5 degrees, $\theta_{c1}$ has accuracy within the range of ±5.625 degrees.

Then, the same method as the derivation of the variable X at the STEP 115 of the embodiment 1 is applied, and a variable Y is defined as in FIG. 15.

At this time, from FIG. 14, the relation between the current phase $\theta_{c1}$ and the variable Y becomes as shown in FIG. 16. Accordingly, by referring to FIG. 17, the current phase $\theta_{c1}$ is obtained from the obtained variable Y, and the accuracy is within the range of ±5.625 degrees.

According to this embodiment 2, since the detection accuracy of the current phase $\theta_{c1}$ is improved, the detection accuracy of the rotation position $\theta$ is also improved.

Embodiment 3

According to the embodiment 1, although the value of $\Delta\theta$ in the expression (24) is obtained in advance by calculation, in the case where $\theta_{s1}$ is sufficiently small, $i_{d1}$ is also sufficiently small, and consequently, $|i_{q1}/i_{d1}|$ becomes a sufficiently large value, so that the value of $\Delta\theta$ may be made to be 90 degrees. In this case, the previously performed derivation of $\Delta\theta$ can be omitted.

Embodiment 4

According to the embodiment 1, although the calculation means $2a$ outputs the rotation position $\theta$ at the time $T_1$, since the rotation position $\theta$ is changed at the angular speed $\omega$, a correction may be made with a time which has elapsed from the time $T_1$ to the output of the rotation position $\theta$. When the elapsed time until the rotation position $\theta$ is outputted is made $T_2$, and $\theta$ after the correction is made $\theta_o$, $\theta_o$ is given by expression (27).

$$\theta_o = \theta + \omega T_2$$

By this, it is possible to keep the accuracy of the rotation position $\theta$ irrespective of the magnitude of the time $T_2$.

Embodiment 5

According to the embodiment 1, at the STEP 117, it is judged whether the present time T has reached $2\times T_1$, and the next processing is carried out. Ax STEP 117, the time when it is judged whether the time T has reached is not limited to $2T_1$, but the time may be made $T_k \times T_1(T_k>1)$. The reason can be explained using the same method as the derivation of the expression (18), and the explanation is omitted.

According to the embodiments 1 to 4, although $2\times T_1$ seconds are necessary for the time of all-phase short-circuiting, in the embodiment 5, if the period of short circuiting exceeds $T_1$, the time of all-phase short-circuiting can be made shorter than $2T_1$ [seconds]. Accordingly, it is possible to detect the rotation position and the rotation speed in a shorter time than the embodiments 1 to 4.

Incidentally, in the above embodiments 1 to 5, when the magnitude of the rotation speed is obtained, the magnitude of the rotation speed is calculated on the basis of the time until the current amplitude value reaches the predetermined value. However, similarly to the prior art, the magnitude of the rotation speed is calculated by obtaining the current amplitude value from the current value after a predetermined time has elapsed from the start of short-circuiting, and on the other hand, the sign of the rotation speed may be detected in such a manner, as described in the embodiments 1 to 5, that a current value is detected twice at predetermined time intervals on the one occurrence of short-circuiting, and the sign of the rotation speed is detected by using the relations of the expressions 19) and (20) from the outer product of the detected current values.

When the magnitude of the rotation speed is obtained, similarly to the embodiments 1 to 5, the magnitude of the rotation speed is calculated on the basis of the time until the current amplitude value reaches the predetermined value, and when the sign of the rotation speed is detected, similarly to the prior art, short circuiting is carried out twice, the current phases after the predetermined time has elapsed are obtained at the first and second short-circuiting respectively, and the sign of the rotation speed may be detected from the sign of the difference of the current phases.

Besides, in the embodiments 1 to 5, when the rotation position is detected, the current value obtained from the detection means is converted into at least two kinds of calculation currents, the current phase is calculated on the basis of the signs of the calculation currents, and a predetermined value is added to or subtracted from the current phase on the basis of the sign of the rotation speed, so that the rotation position is outputted. However, similarly to the prior art, the rotation position may be detected using the expression (6) expressed by the arc tangent function.

Industrial Applicability

The rotation state detecting apparatus of the synchronous machine and the rotation state detecting method of the synchronous machine according to the present invention can be used as the rotation state detecting apparatus and the rotation state detection method for not only the synchronous motor but also a general synchronous machine such as a synchronous generator.

What is claimed is:

1. A rotation state detecting apparatus for a synchronous machine, comprising:
   calculation means for outputting a voltage vector command and a trigger signal and for outputting a rotation state of a synchronous machine having at least three phase windings, in an idle state;
   circuit means for applying voltages to respective phases of the synchronous machine based on the voltage vector command; and
   detection means for detecting a current of the synchronous machine based on the trigger signal and for outputting a value indicating the current detected to the calculation means, wherein the calculation means;

outputs a voltage vector for short-circuiting the respective phases of the synchronous machine, short-circuits the respective phases of the synchronous machine, outputs a plurality of trigger signals on at least one occurrence of all-phase short-circuiting to obtain values indicating currents detected by the detection means a plurality of times, and calculates the rotation state of the synchronous machine and sign of rotation speed of the synchronous machine, based on currents detected at least twice on one occurrence of the all-phase short-circuiting, so that when a salient pole ratio of winding inductance of the synchronous machine is larger than two, the sign is different from when the salient pole ratio is smaller than two.

2. The rotation state detecting apparatus for a synchronous machine according to claim 1, wherein the calculation means calculates a current amplitude value in regard to the value obtained from the detection means each time the trigger signal is output, and calculates magnitude of a rotation speed of the synchronous machine based on time until the current amplitude value reaches a predetermined value.

3. The rotation state detecting apparatus for a synchronous machine according to claim 2, wherein, after the current amplitude value reaches the predetermined value, the calculation means changes the voltage vector output to the circuit means from the voltage vector for short-circuiting the respective phases of the synchronous machine to a voltage vector for making the current amplitude value zero.

4. The rotation state detecting apparatus for a synchronous machine according to claim 2, wherein, if the current amplitude value does not reach the predetermined value after a maximum stand-by time elapses from start of the short-circuiting, the calculation means determines that the synchronous machine is not idle, and outputs the rotation speed as zero.

5. The rotation state detecting apparatus for a synchronous machine according to claim 1, wherein the calculation means converts the value obtained from the detection means into at least two kinds of calculation currents, calculates a current phase based on signs of the calculation currents, and adds a predetermined value to or subtracts a predetermined value from the current phase based on sign of rotation speed of the synchronous machine, to output rotation position of the synchronous machine.

* * * * *